(12) United States Patent
Richards et al.

(10) Patent No.: US 12,420,370 B2
(45) Date of Patent: Sep. 23, 2025

(54) DUST COLLECTOR INCLUDING FILTER CLEANING MECHANISM

(71) Applicant: MILWAUKEE ELECTRIC TOOL CORPORATION, Brookfield, WI (US)

(72) Inventors: Daryl S. Richards, Sussex, WI (US); Joseph R. Beeson, Kansas City, MO (US); Daniel Simmons, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 90 days.

(21) Appl. No.: 18/139,413

(22) Filed: Apr. 26, 2023

(65) Prior Publication Data
US 2023/0264312 A1   Aug. 24, 2023

Related U.S. Application Data

(63) Continuation of application No. 16/688,227, filed on Nov. 19, 2019, now Pat. No. 11,673,217.
(Continued)

(51) Int. Cl.
*B23Q 11/00* (2006.01)
*A47L 9/20* (2006.01)
*B23B 49/00* (2006.01)

(52) U.S. Cl.
CPC ............ *B23Q 11/0046* (2013.01); *A47L 9/20* (2013.01); *B23B 49/006* (2013.01);
(Continued)

(58) Field of Classification Search
CPC ............ B23Q 11/0046; B23Q 11/0071; B23Q 17/007; B01D 29/72
See application file for complete search history.

(56) References Cited

U.S. PATENT DOCUMENTS 2,384,707 A   9/1945  Sweet
2,990,024 A   6/1961  Van Allsburg
(Continued)

FOREIGN PATENT DOCUMENTS

CN   203702040 U   7/2014
CN   104002282 A   8/2014
(Continued)

OTHER PUBLICATIONS

Tool Specialist, "D25302DH 36 Volt Dust Extraction System Dewalt D25302DH-XJ," <https://www.toolspecialist.be/d25302dh-36-volt-dust-extraction-system-dewalt-d25302dh-xj?_store=fr&> webpage accessed Apr. 3, 2019.
(Continued)

*Primary Examiner* — Daniel Jeremy Leeds
(74) *Attorney, Agent, or Firm* — Quarles & Brady LLP

(57) ABSTRACT

A dust collector for use with a hand-held power tool. The dust collector includes a housing, a motor positioned in the housing, and a telescoping suction pipe coupled to the housing. The dust collector also includes a suction fan coupled to the motor and operable to generate a vacuum in the suction pipe. The dust collector further includes a dust container coupled to the housing and positioned upstream of the suction fan, and a filter at least partially arranged in the dust container. The dust collector also includes a filter cleaning mechanism including a solenoid configured to be actuated by a controller to dislodge dust from the filter when either the motor or the suction fan transitions from an active state to an inactive state.

20 Claims, 22 Drawing Sheets

Related U.S. Application Data

(60) Provisional application No. 62/879,695, filed on Jul. 29, 2019, provisional application No. 62/814,934, filed on Mar. 7, 2019, provisional application No. 62/801,497, filed on Feb. 5, 2019, provisional application No. 62/769,396, filed on Nov. 19, 2018.

(52) U.S. Cl.
CPC ...... *B23Q 11/0071* (2013.01); *B23B 2270/30* (2013.01); *B23B 2270/62* (2013.01)

(56) References Cited

U.S. PATENT DOCUMENTS

| | | |
|---|---|---|
| 3,172,204 A | 3/1965 | Frey |
| 3,320,725 A | 5/1967 | Foster |
| 3,591,888 A | 7/1971 | Takeda et al. |
| 3,639,940 A | 2/1972 | Carlson et al. |
| 3,708,962 A | 1/1973 | Deguchi et al. |
| 3,710,552 A | 1/1973 | Genton |
| 3,776,647 A | 12/1973 | Hart |
| 3,797,064 A | 3/1974 | MacFarland |
| 3,850,254 A | 11/1974 | Hirdes |
| 4,099,940 A | 7/1978 | Mortensen et al. |
| 4,250,971 A | 2/1981 | Reibetanz et al. |
| 4,383,840 A | 5/1983 | Jones |
| 4,652,184 A | 3/1987 | Fischer |
| 4,661,129 A | 4/1987 | Nederman |
| 4,711,609 A | 12/1987 | Seefluth |
| 5,090,499 A | 2/1992 | Cuneo |
| 5,688,082 A | 11/1997 | Richardson |
| 5,765,654 A | 6/1998 | Burger |
| 5,899,644 A | 5/1999 | Buck et al. |
| 5,993,122 A | 11/1999 | Baker |
| 6,315,647 B1 | 11/2001 | Ghilardi |
| 6,391,073 B1 | 5/2002 | Koga |
| 6,443,676 B1 | 9/2002 | Kopras |
| 6,587,184 B2 | 7/2003 | Wursch et al. |
| 6,615,930 B2 | 9/2003 | Bongers-Ambrosius et al. |
| D499,946 S | 12/2004 | Stirm |
| 6,835,030 B2 | 12/2004 | Pozgay et al. |
| 6,851,898 B2 | 2/2005 | Ege et al. |
| 6,887,146 B2 | 5/2005 | Staas et al. |
| 6,949,130 B1 | 9/2005 | Grey et al. |
| 6,951,439 B2 | 10/2005 | Arich |
| 7,118,609 B2 | 10/2006 | Valentini |
| 7,182,150 B2 | 2/2007 | Grossman |
| 7,186,281 B2 | 3/2007 | Cheng |
| 7,220,088 B2 | 5/2007 | Ferrari et al. |
| 7,281,886 B2 | 10/2007 | Stoerig |
| 7,282,074 B1 | 10/2007 | Witter |
| 7,322,429 B2 | 1/2008 | Kim |
| 7,323,023 B2 | 1/2008 | Michele et al. |
| 7,347,651 B2 | 3/2008 | Hintze et al. |
| 7,354,226 B2 | 4/2008 | Britz |
| 7,425,109 B2 | 9/2008 | Simm et al. |
| 7,455,486 B2 | 11/2008 | Britz |
| 7,520,017 B2 | 4/2009 | Wilmo et al. |
| 7,644,469 B2 | 1/2010 | Beers et al. |
| 7,794,184 B2 | 9/2010 | Di Nicolantonio et al. |
| 7,797,794 B2 | 9/2010 | Bleicher et al. |
| 7,871,463 B2 | 1/2011 | Hayama et al. |
| 7,875,094 B2 | 1/2011 | Baumann et al. |
| 7,909,114 B2 | 3/2011 | Nishikawa et al. |
| 7,962,994 B2 | 6/2011 | Beers |
| 7,966,691 B2 | 6/2011 | Takahashi et al. |
| 8,186,453 B2 | 5/2012 | Furusawa et al. |
| 8,266,761 B2 | 9/2012 | Beers |
| 8,272,134 B2 | 9/2012 | Soika et al. |
| 8,327,487 B2 | 12/2012 | Kunz et al. |
| 8,342,782 B2 | 1/2013 | Nishikawa et al. |
| 8,388,415 B2 | 3/2013 | Soika et al. |
| 8,397,342 B2 | 3/2013 | Baker et al. |
| 8,443,485 B2 | 5/2013 | Kunz et al. |
| 8,479,964 B2 | 7/2013 | Furusawa et al. |
| 8,561,512 B2 | 10/2013 | Lovelass et al. |
| 8,651,776 B2 | 2/2014 | Khurana |
| 8,740,513 B2 | 6/2014 | Santamarina et al. |
| 8,869,786 B2 | 10/2014 | Faiweather et al. |
| 8,876,932 B2 | 11/2014 | Machida et al. |
| 8,997,887 B2 | 4/2015 | Furusawa et al. |
| 9,022,702 B2 | 5/2015 | Kasuya et al. |
| 9,033,769 B2 | 5/2015 | Mizutani et al. |
| 9,056,379 B2 | 6/2015 | Yoshikane et al. |
| 9,067,292 B2 | 6/2015 | Appel |
| 9,132,572 B2 | 9/2015 | Ishikawa et al. |
| 9,221,110 B2 | 12/2015 | Guth |
| 9,545,710 B2 | 1/2017 | Boice |
| 9,776,296 B2 | 10/2017 | Brewster et al. |
| 9,855,632 B2 | 1/2018 | Rubens et al. |
| 9,943,940 B2 | 4/2018 | Furusawa et al. |
| 10,245,718 B2 | 4/2019 | Glauning |
| 10,864,609 B2 | 12/2020 | Mori et al. |
| 2001/0052429 A1 | 12/2001 | Frenzel et al. |
| 2003/0044247 A1 | 3/2003 | Wolfe |
| 2006/0153650 A1 | 7/2006 | Simm et al. |
| 2006/0178087 A1 | 8/2006 | Wuensch et al. |
| 2006/0260281 A1 | 11/2006 | Peng |
| 2008/0189899 A1 | 8/2008 | Beers et al. |
| 2008/0203679 A1 | 8/2008 | Hermoso |
| 2009/0019710 A1 | 1/2009 | Grossman et al. |
| 2009/0136309 A1 | 5/2009 | Coulston et al. |
| 2009/0139047 A1 | 6/2009 | Williams |
| 2009/0183633 A1 | 7/2009 | Schiler et al. |
| 2010/0000386 A1 | 1/2010 | Dagn |
| 2012/0063856 A1 | 3/2012 | Miwa et al. |
| 2012/0073077 A1 | 3/2012 | Ishikawa et al. |
| 2012/0273243 A1 | 11/2012 | Tada et al. |
| 2013/0213683 A1 | 8/2013 | Brewster et al. |
| 2013/0283563 A1 | 10/2013 | Fry et al. |
| 2015/0040341 A1 | 2/2015 | Wiedemann et al. |
| 2015/0251117 A1 | 9/2015 | Madonia et al. |
| 2015/0351288 A1* | 12/2015 | Fukuda ............... H05K 7/20181 361/679.48 |
| 2015/0360298 A1 | 12/2015 | Buczek |
| 2016/0016270 A1 | 1/2016 | Batres et al. |
| 2016/0100724 A1 | 4/2016 | Valentini |
| 2016/0250731 A1 | 9/2016 | Wong et al. |
| 2017/0056988 A1 | 3/2017 | Guth |
| 2017/0087707 A1 | 3/2017 | Appel |
| 2017/0173748 A1 | 6/2017 | Ullrich et al. |
| 2017/0173775 A1 | 6/2017 | Ullrich |
| 2017/0203402 A1 | 7/2017 | Machida et al. |
| 2017/0232565 A1 | 8/2017 | Machida |
| 2017/0355053 A1 | 12/2017 | Furusawa et al. |
| 2018/0028032 A1 | 2/2018 | Schuele et al. |
| 2018/0147681 A1 | 5/2018 | Le et al. |
| 2018/0200852 A1 | 7/2018 | Yoshikane |
| 2018/0280857 A1 | 10/2018 | Ullrich |
| 2019/0030669 A1 | 1/2019 | Wu |
| 2019/0084109 A1 | 3/2019 | Nemetz et al. |
| 2019/0101422 A1 | 4/2019 | Koenigbauer et al. |
| 2019/0193225 A1 | 6/2019 | Beeson et al. |
| 2019/0350422 A1 | 11/2019 | Lui et al. |
| 2019/0358758 A1* | 11/2019 | Ullrich ............... B23Q 11/0046 |
| 2020/0077852 A1 | 3/2020 | Bayha et al. |
| 2020/0121146 A1 | 4/2020 | Ohlendorf |
| 2020/0290167 A1 | 9/2020 | Takeuchi |
| 2021/0178568 A1 | 6/2021 | Machida et al. |

FOREIGN PATENT DOCUMENTS

| | | |
|---|---|---|
| CN | 104741660 A | 7/2015 |
| CN | 205184689 U | 4/2016 |
| CN | 105772798 A | 7/2016 |
| CN | 106312129 A | 1/2017 |
| CN | 106419728 A | 2/2017 |
| CN | 206296530 U | 7/2017 |
| DE | 2534169 A1 | 2/1977 |
| DE | 2546531 A1 | 4/1977 |
| DE | 2925908 A1 | 1/1981 |
| DE | 3006799 A1 | 7/1981 |
| DE | 3146225 A1 | 5/1983 |
| DE | 3324615 C2 | 5/1984 |

(56) References Cited

FOREIGN PATENT DOCUMENTS

| | | |
|---|---|---|
| DE | 2940362 C2 | 11/1985 |
| DE | 3827556 A1 | 2/1990 |
| DE | 4406597 A1 | 9/1995 |
| DE | 20301042 U1 | 3/2003 |
| DE | 10342515 A1 | 5/2005 |
| DE | 10319597 B4 | 7/2006 |
| DE | 202006009078 U1 | 10/2007 |
| DE | 102006029624 A1 | 1/2008 |
| DE | 19807282 B4 | 4/2008 |
| DE | 102009054968 A1 | 6/2011 |
| DE | 202010009989 U1 | 4/2012 |
| DE | 102011075013 A1 | 10/2012 |
| DE | 202012007437 U1 | 11/2012 |
| DE | 102011079294 A1 | 1/2013 |
| DE | 102011087362 A1 | 5/2013 |
| DE | 102012200543 A1 | 7/2013 |
| DE | 102012003073 A1 | 8/2013 |
| DE | 102012211635 A1 | 1/2014 |
| DE | 102012023328 B3 | 5/2014 |
| DE | 102013212022 A1 | 1/2015 |
| DE | 102013215788 A1 | 2/2015 |
| DE | 102013018278 A1 | 4/2015 |
| DE | 102014007402 A1 | 11/2015 |
| DE | 102014014373 A1 | 4/2016 |
| DE | 102015110714 A1 | 1/2017 |
| DE | 202017100783 U1 | 4/2017 |
| DE | 102016014210 A1 | 10/2017 |
| DE | 102017100541 A1 | 7/2018 |
| DE | 102017201558 A1 | 8/2018 |
| DE | 102017201560 A1 | 8/2018 |
| DE | 102017201563 A1 | 8/2018 |
| DE | 102017201565 A1 | 8/2018 |
| DE | 102017201567 A1 | 8/2018 |
| EP | 0130747 A2 | 1/1985 |
| EP | 1023967 B1 | 10/2004 |
| EP | 1604777 B1 | 9/2006 |
| EP | 1377412 B1 | 7/2007 |
| EP | 1714735 B1 | 10/2007 |
| EP | 2011594 A2 | 1/2009 |
| EP | 1429891 B1 | 6/2009 |
| EP | 2481522 A2 | 8/2012 |
| EP | 2011992 B1 | 11/2014 |
| EP | 3132890 A1 | 2/2017 |
| EP | 2789283 B1 | 4/2017 |
| EP | 3461596 A1 | 4/2019 |
| GB | 2043483 A | 10/1980 |
| GB | 1602263 A | 11/1981 |
| GB | 2486805 A | 6/2012 |
| JP | 2012192492 A | 10/2012 |
| JP | 2014231128 A | 12/2014 |
| WO | WO2008/003544 A1 | 1/2008 |
| WO | WO2008/064952 A1 | 6/2008 |
| WO | WO2014/168114 A1 | 10/2014 |
| WO | WO2016/096495 A1 | 6/2016 |
| WO | WO2017/040730 A1 | 3/2017 |

OTHER PUBLICATIONS

Makita Tools, "Makita 1 Rotary Hammers Deliver Performance, Less Vibration and Dust Extraction, New AVT rotary hammers with HEPA vacuums are OSHA compliant and ideal for overhead drilling," <https://www.makitatools.com/company/press-releases/2017/makita-1-rotary-hammers-deliver-performance> published Aug. 14, 2017.

Dewalt, "DWH304DH Dust Extraction System with HEPA Filter Instruction Manual," 2015, 28 pages.

Extended European Search Report for Application No. 19886984.4 dated Feb. 13, 2023 (8 pages).

\* cited by examiner

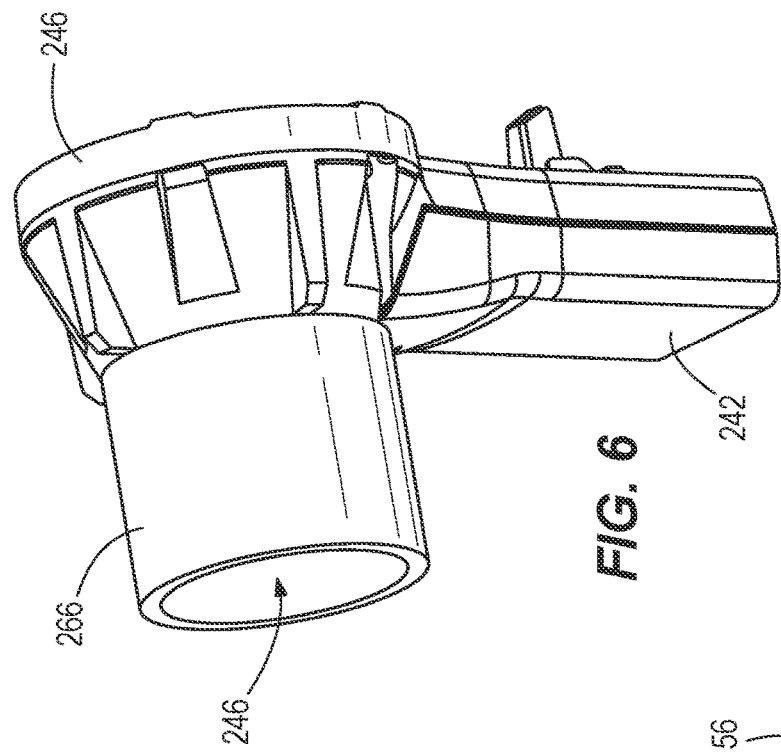
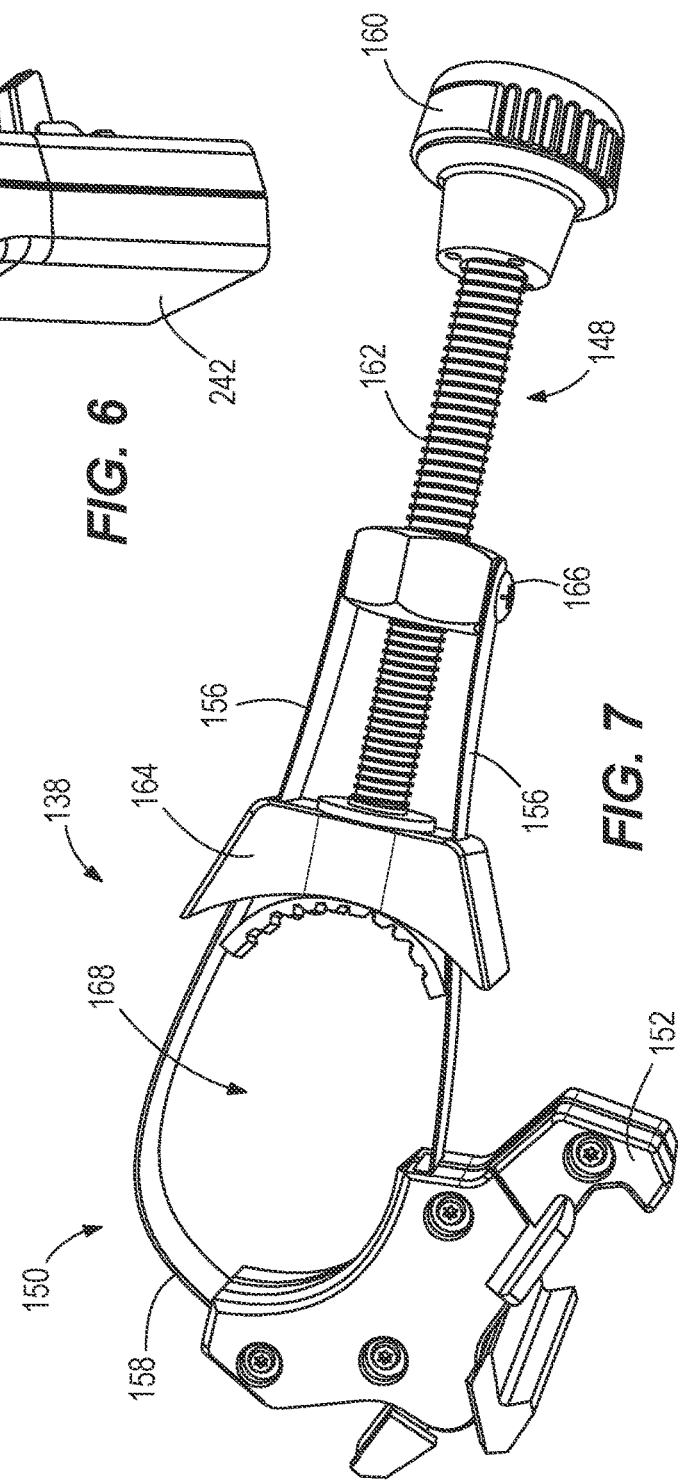

DUST COLLECTOR INCLUDING FILTER CLEANING MECHANISM

CROSS-REFERENCE TO RELATED APPLICATIONS

This application is a continuation of co-pending U.S. patent application Ser. No. 16/688,227, filed on Nov. 19, 2019, which claims priority to U.S. Provisional Patent Application No. 62/879,695, filed Jul. 29, 2019, and to U.S. Provisional Patent Application No. 62/814,934, filed Mar. 7, 2019, and to U.S. Provisional Patent Application No. 62/801,497, filed Feb. 5, 2019, and to U.S. Provisional Patent Application No. 62/769,396, filed Nov. 19, 2018, the entire contents of all of which are hereby incorporated by reference.

FIELD OF THE INVENTION

The present invention relates to power tools, and more particularly to dust collectors for use with power tools.

BACKGROUND OF THE INVENTION

Dust collectors are typically used in tandem with hand-held drilling tools such as rotary hammers to collect dust and other debris during a drilling operation to prevent dust and other debris from accumulating at a worksite. Such dust collectors may be attached to a rotary hammer to position a suction inlet of the collector proximate a drill bit attached to the rotary hammer. Such dust collectors may also include an on-board dust container in which dust and other debris is accumulated. Such dust containers are often removable from the dust collector to facilitate disposal of the accumulated dust and debris.

SUMMARY OF THE INVENTION

The invention provides, in one aspect, a dust collector for use with a hand-held power tool. The dust collector includes a housing, a telescoping suction pipe coupled to the housing, and a suction fan positioned within the housing and operable to generate a vacuum in the suction pipe. The suction pipe is configured to telescope toward and away from the housing. The suction pipe includes an outer pipe supported by the housing, and an inner pipe slidably received into the outer pipe.

The invention provides, in another aspect, a dust collector for use with a hand-held power tool. The dust collector includes a housing, a motor positioned in the housing, and a telescoping suction pipe coupled to the housing. The dust collector also includes a suction fan coupled to the motor and operable to generate a vacuum in the suction pipe. The dust collector further includes a dust container coupled to the housing and positioned upstream of the suction fan, and a filter at least partially arranged in the dust container. The dust collector also includes a filter cleaning mechanism including a solenoid configured to be actuated by a controller to dislodge dust from the filter when either the motor or the suction fan transitions from an active state to an inactive state.

The invention provides, in another aspect, a dust collector for use with a hand-held power tool. The dust collector includes a housing, and a motor having a motor shaft rotatable in a first rotational direction and in a second rotational direction opposite the first rotational direction. The dust collector also includes a telescoping suction pipe coupled to the housing, and a suction fan coupled to the motor and operable to generate a vacuum in the suction pipe when the motor shaft rotates in the first rotational direction. The dust collector further includes a dust container coupled to the housing and positioned upstream of the suction fan, and a filter at least partially arranged in the dust container. The dust collector also includes a filter cleaning mechanism configured to dislodge dust from the filter when the motor shaft rotates in the second rotational direction.

The invention provides, in another aspect, a dust collector for use with a hand-held power tool. The dust collector includes a housing, a motor positioned in the housing, and a telescoping suction pipe coupled to the housing and configured to telescope toward and away from the housing. The dust collector also includes a suction fan coupled to the motor and operable to generate a vacuum in the suction pipe. The dust collector further includes a dust container coupled to the housing and positioned upstream of the suction fan, and a filter at least partially arranged in the dust container. The dust collector further includes a filter cleaning mechanism including a hammer movable between a loaded position, in which the hammer is biased toward engagement with the filter, and a released position, in which the hammer impacts the filter to dislodge dust therefrom. As the suction pipe telescopes toward and away from the housing, the suction pipe engages the filter cleaning mechanism to cause the hammer to move between the loaded and released positions.

The invention provides, in another aspect, a dust collector for use with a hand-held power tool. The dust collector includes a housing, a motor positioned in the housing, a suction pipe coupled to the housing, and a suction fan coupled to the motor and operable to generate a vacuum in the suction pipe. The dust collector also includes a dust container coupled to the housing and positioned upstream of the suction fan, and a filter at least partially arranged in the dust container. The dust collector further includes a monitoring system configured to detect clogs in the filter by detecting a characteristic value of the dust collector and determining whether the characteristic value exceeds a predetermined threshold.

Other features and aspects of the invention will become apparent by consideration of the following detailed description and accompanying drawings.

BRIEF DESCRIPTION OF THE DRAWINGS

FIG. 6 is an extension nozzle for use with any of the dust collectors of FIGS. 1-5.

FIG. 7 is a handle assembly for use with any of the dust collectors of FIGS. 1-5.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
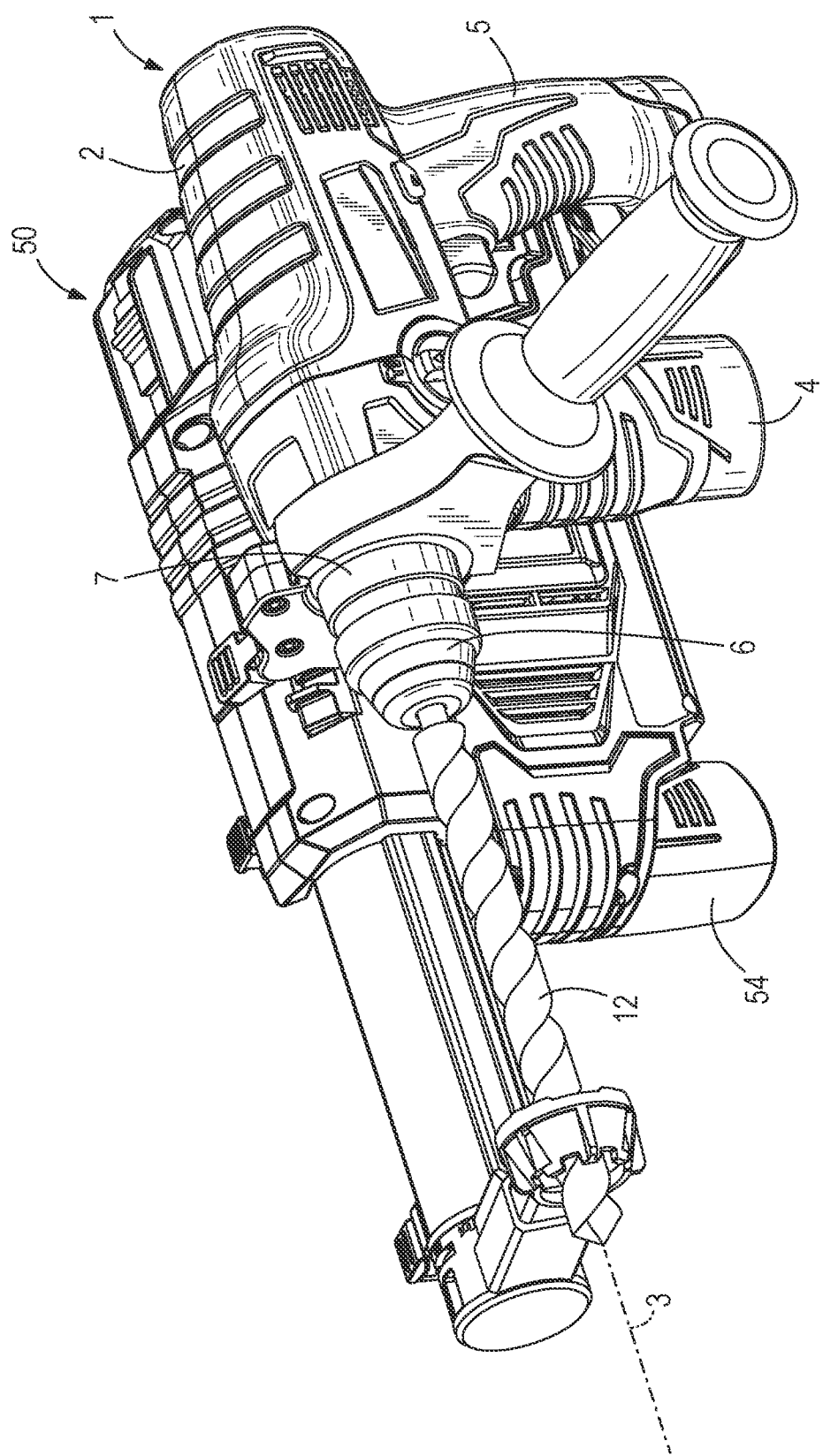
FIG. 1 is a front perspective view of a power tool assembly including a dust collector mounted to a rotary power tool.
Figure 2:
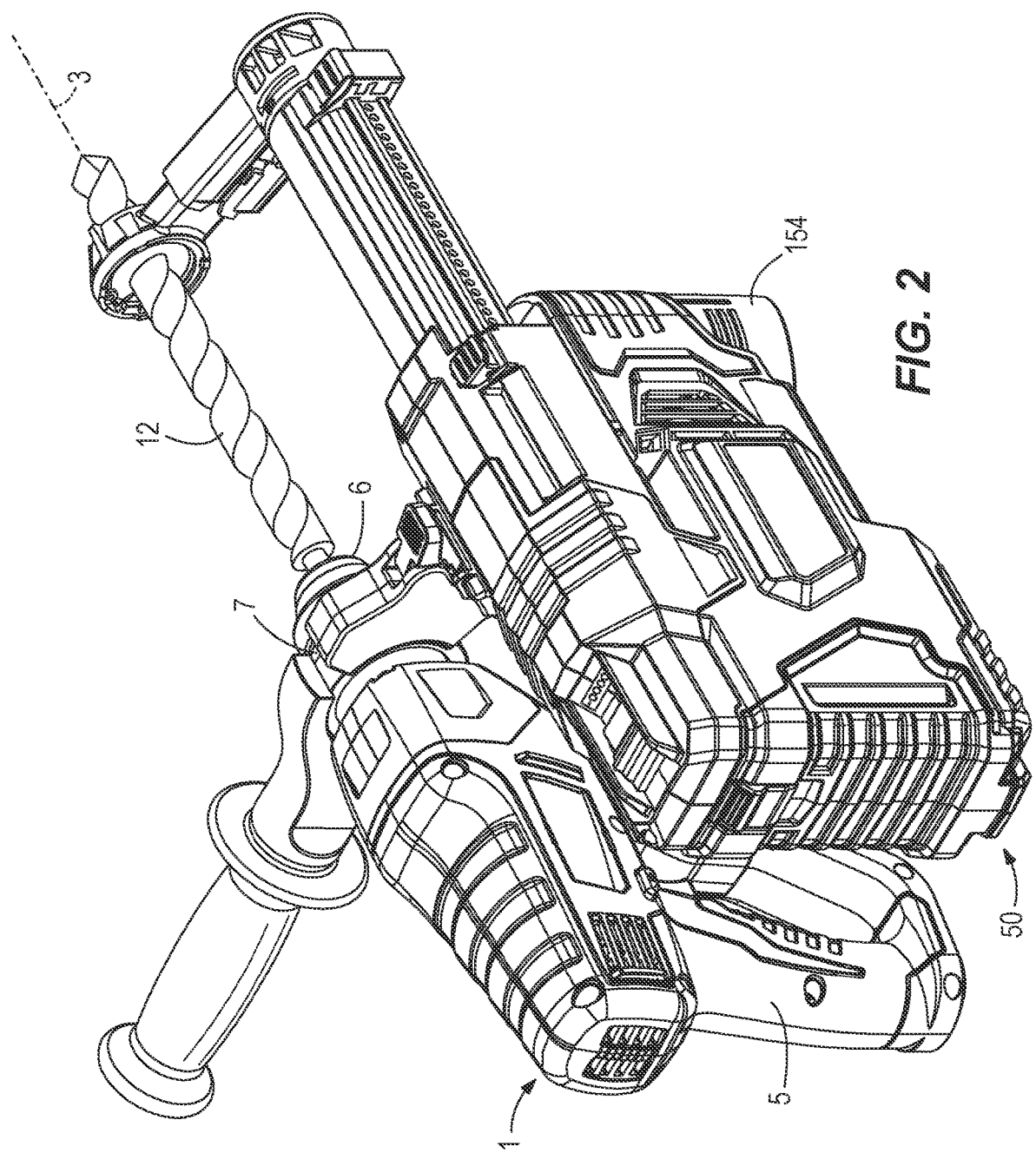
FIG. 2 is a rear perspective view of the dust collector and rotary power tool of FIG. 5.

FIGS. 1 and 2 illustrate a power tool assembly 100 including a power tool 1 and a dust collector 50. As will be described in more detail below, the dust collector 50 is operable to collect dust and other debris from a workpiece during a drilling and/or hammering operation performed by the power tool 1 to maintain the user's work area substantially clear of dust. In the illustrated embodiment, the power tool 1 is a drilling machine or rotary power tool, which may be configured as a percussion rotary power tool, a rotary hammer, or a hammer drill. The power tool 1 includes a housing 2 in which a spindle (not shown) is drivable in a rotary manner about an axis of rotation 3. For this purpose, the rotary power tool 1 includes an electric motor (not shown) for driving rotation of the spindle. The illustrated power tool 1 is powered by a battery 4, such as a rechargeable battery pack. In other embodiments, the power tool 1 may include a cord to enable the power tool 1 to be powered by AC power. The rotary power tool 1 is also equipped with a handle 5. It may thus be operated by hand and accordingly be designated a hand-held rotary power tool 1.

The rotary power tool 1 is also equipped with a chuck 6 that is drivable in a rotary manner about axis of rotation 3 via the spindle. The chuck 6 serves to hold a working tool 12, particularly a drilling tool, which may be a drill bit, a hammer drill bit, or a masonry drill bit. When the drill bit 12 is in place, it rotates about the axis of rotation 3, which will also be referred to in the following as the axis of rotation 3 of the power tool 1. Adjacent to the chuck 6, the housing 2 of rotary power tool 1 is furnished with a clamping neck 7, which has a cylindrical shape in the illustrated embodiment. The clamping neck 7 is normally used for mounting an additional handle.

The rotary power tool 1 shown in FIGS. 1 and 2 is equipped with a dust suction device or dust collector 50 in accordance with an embodiment of the invention. The dust collector 50 constitutes a separate device from the rotary power tool 1, and may be attached and detached to the rotary power tool 1 without using tools. The dust collector 50 may be powered independently of the power tool 1, for example, by a rechargeable battery 54. In the illustrated embodiment, the dust collector 50 and the power tool 1 include separate batteries 54, 4, respectively, each of which may be interchangeably coupled with the power tool 1 and the dust collector 50. In other words, the dust collector 50 and the power tool 1 may be independently powered using identical batteries 54, 4. However, in other embodiments, the dust collector 50 and the power tool 1 may share a power source. For example, the dust collector 50 may be powered by the battery 4 of the power tool 1. In addition, in some embodiments, one or both of the power tool 1 and the dust collector 50 may include a cord that provides AC power.

Figure 3:
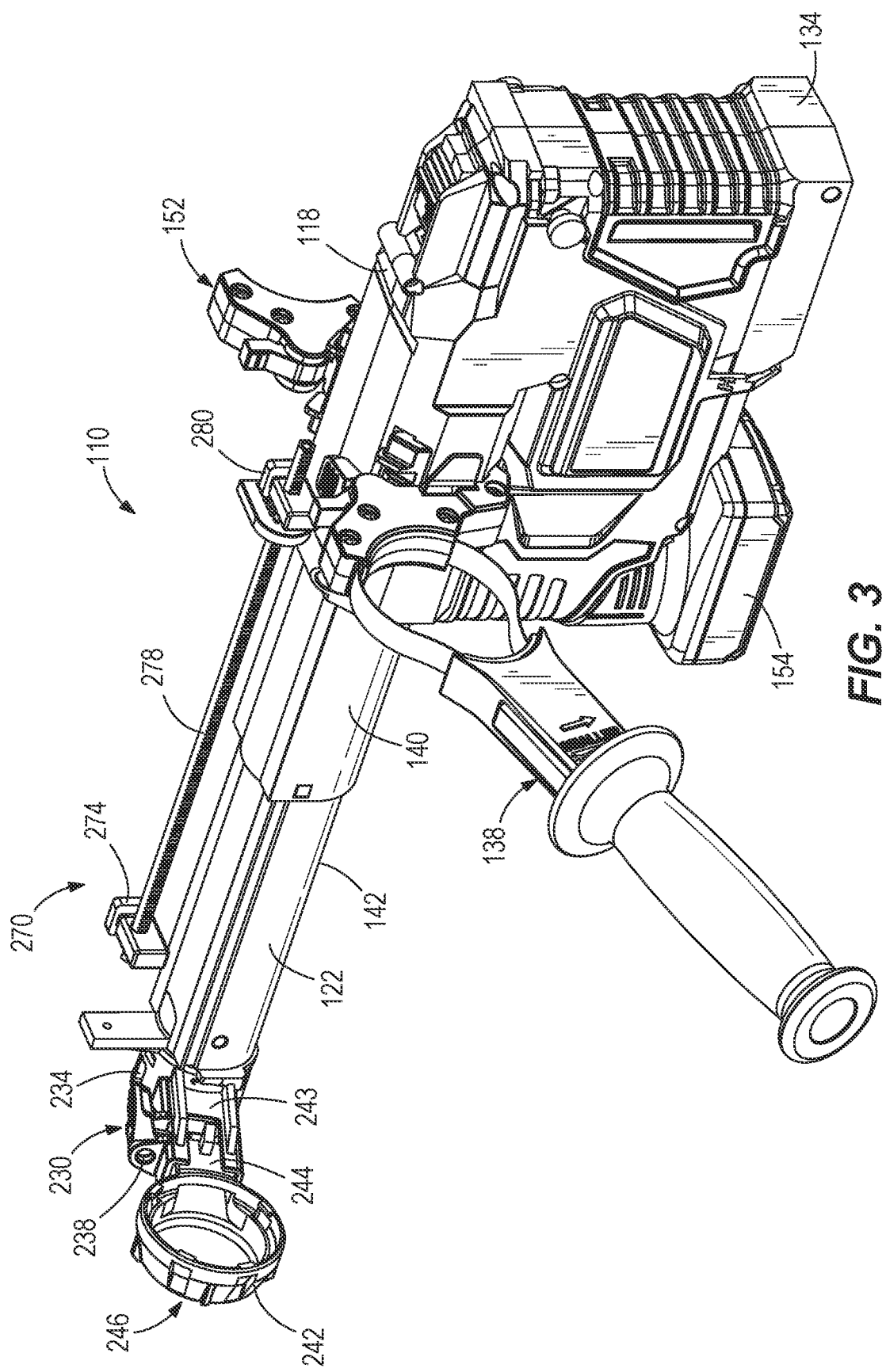
FIG. 3 is a rear perspective view of a dust collector in accordance with an embodiment of the invention.
Figure 4:
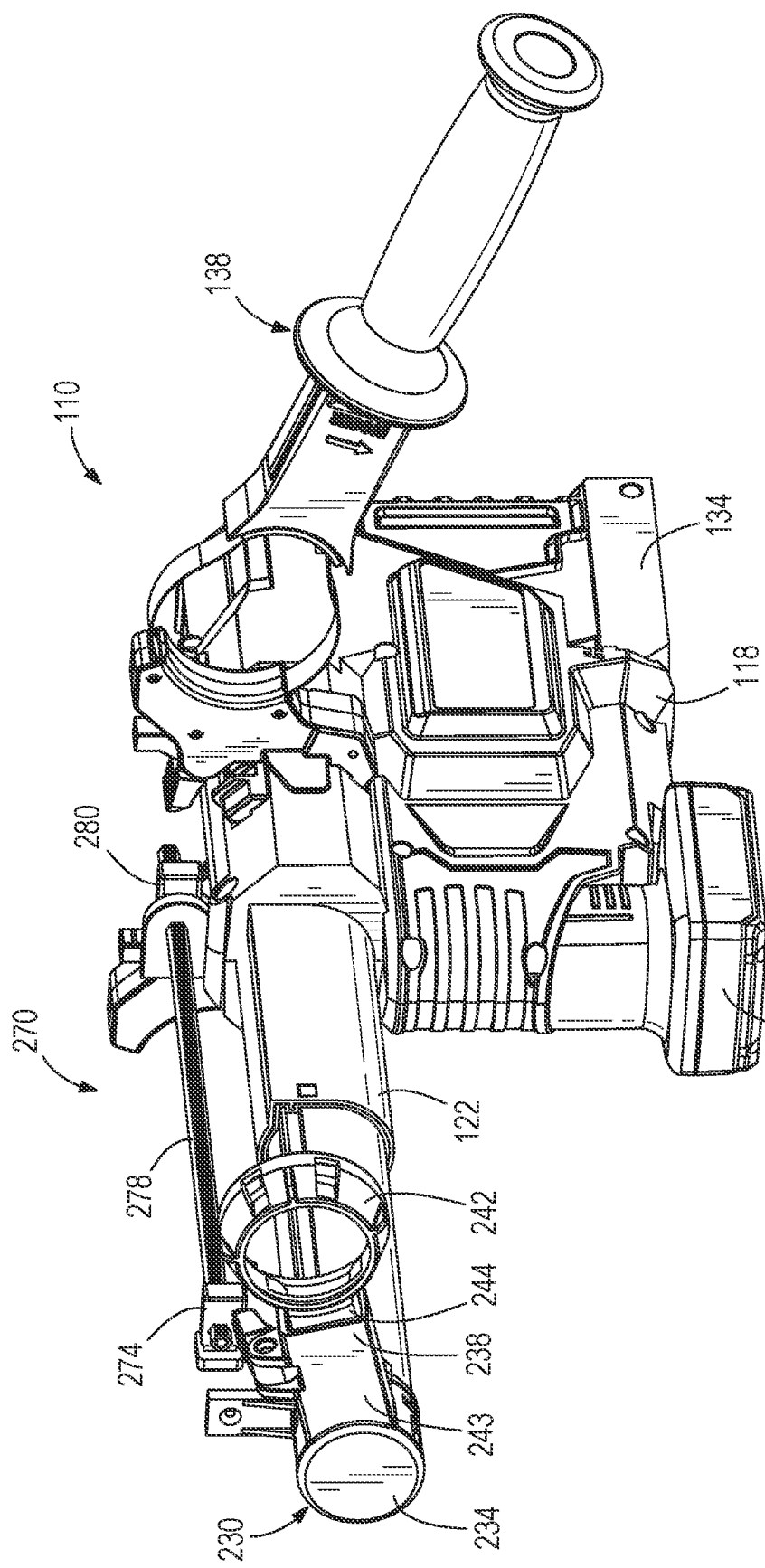
FIG. 4 is a front perspective view of the dust collector of FIG. 3

FIGS. 3 and 4 illustrate another embodiment of a dust collector 110 detached from the power tool 1. The dust collector 110 includes a housing 118, a suction pipe 122 coupled to the housing 118, an electric motor 126 (FIG. 8) positioned in the housing 118 and powered by a battery 154, a suction fan 130 (FIG. 8) driven by the electric motor 126 and operable to generate a vacuum in the suction pipe 122, and a dust container 134 (FIG. 8) coupled to the housing 118 and positioned upstream of the suction fan 130. In addition, the dust collector 110 includes a handle assembly 138 that supports the power tool 1 in a side-by-side relationship with the dust collector 110.

The suction pipe 122 of the dust collector 110 telescopes relative to the housing 118. As the drill bit 12 plunges into the workpiece, the suction pipe 122 retracts into the housing 118 of the dust collector 110 in a telescoping manner. Therefore, the drill bit 12 can only extend into the workpiece an equal depth as the suction pipe 122 retracts. The farther the suction pipe 122 can retract, the greater drilling depth is available for the drill bit 12. Accordingly, making the suction pipe 122 a telescoping tube increases the drilling depth of the drill bit 12.

For this purpose, the suction pipe 122 includes an outer pipe 140 arranged on the housing 118 and an inner pipe 142 arranged coaxially therewith and positioned inside the outer pipe 140 so as to be slidable in a telescoping manner (FIG. 3). The inner pipe 142 carries a suction head 230. The outer pipe 140 is attached to the housing 118 so as to be axially adjustable. The outer pipe 140 thus enables the suction pipe 122 to be adjusted axially so that the dust collector 110 may be adapted to the differing lengths of the drilling tool with which it is used, for example a drill bit, a masonry drill bit, or a hammer drill bit. The telescoping capability of the suction pipe 122 enables the dust collector 110 to be adjusted automatically and steplessly to the drilling depth while the rotary power tool 1 is being operated. As the depth of the hole created with the drilling tool increases, so the inner pipe 142 extends deeper into the outer pipe 140. The inner pipe 142 may be braced axially against the outer pipe 140 via a compression spring (not shown). In this way, the inner pipe 142 is pre-tensioned outwardly to maintain the suction head 230 against the object being drilled.

Figure 5:
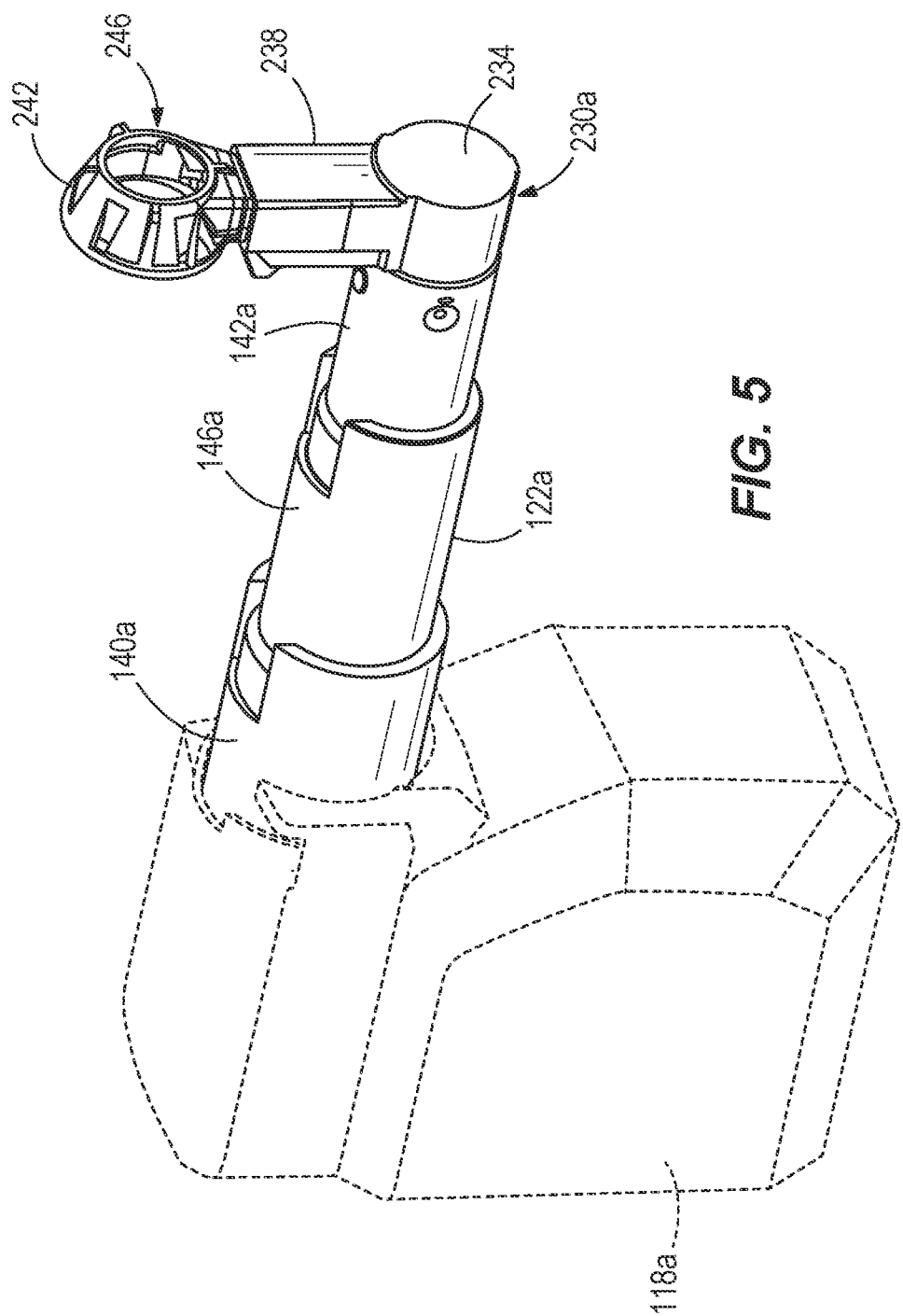
FIG. 5 is a front perspective view of another embodiment of a dust collector including a telescoping suction pipe.

FIG. 5 illustrates another embodiment of a suction pipe 122*a*, which includes additional telescoping members. Specifically, in this embodiment, the suction pipe 122*a* includes an outer pipe 140*a* coupled to a housing 118*a* of the dust collector 110*a*, an inner pipe 142*a* supporting a suction head 230*a*, and an extension pipe 146*a* coupling the outer pipe 140*a* to the inner pipe 142*a*. The extension pipe 146*a* enables the suction pipe 122*a* to have a relatively long extended length while still being able to retract into a compact housing 118*a*. The suction pipe 122*a* may include additional extension pipes 146*a* between the outer pipe 140*a* and the inner pipe 142*a* for additional telescoping capabilities.

Figure 19:
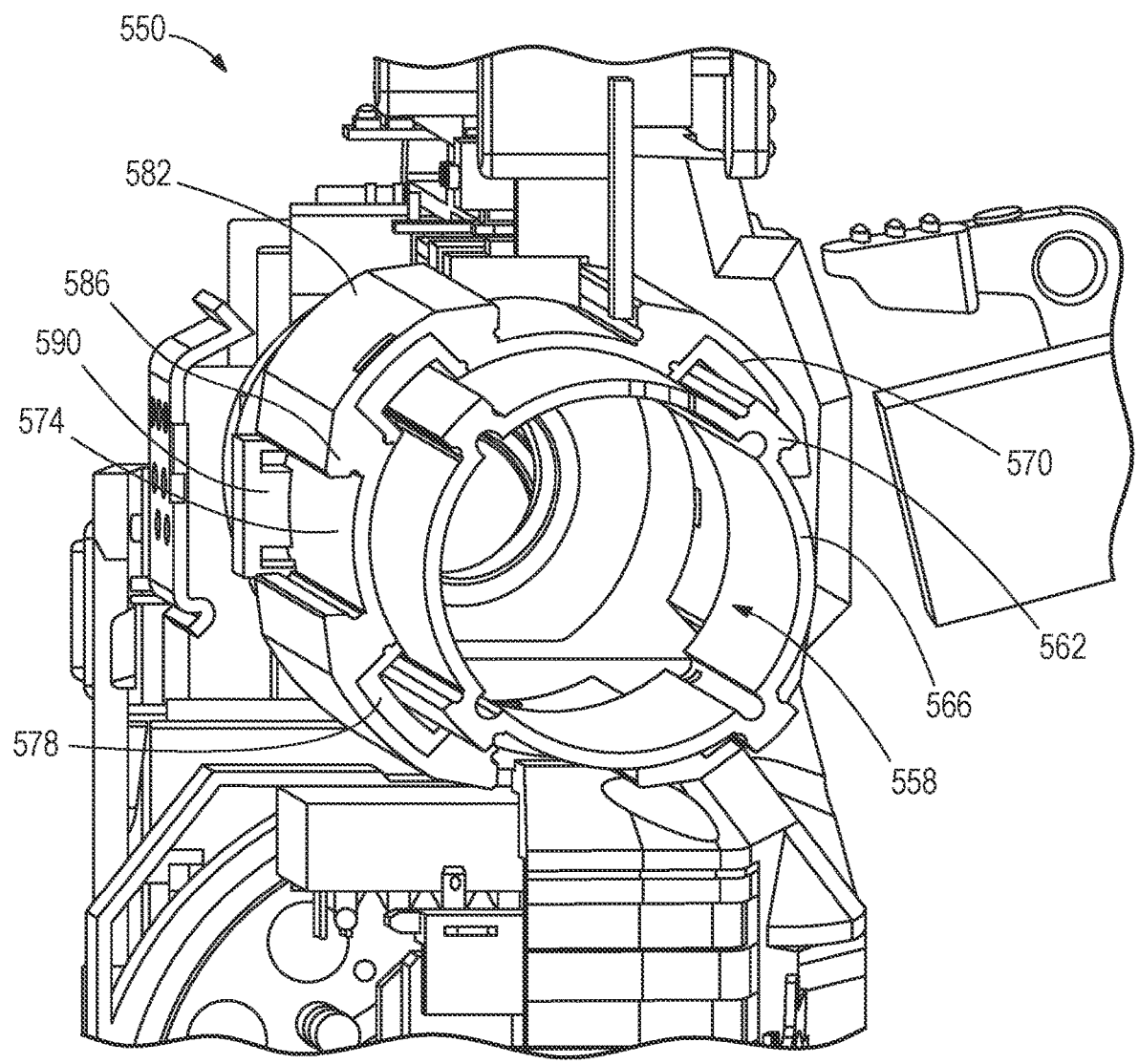
FIG. 19 is a perspective view of a telescoping suction pipe according to another embodiment.
Figure 20:
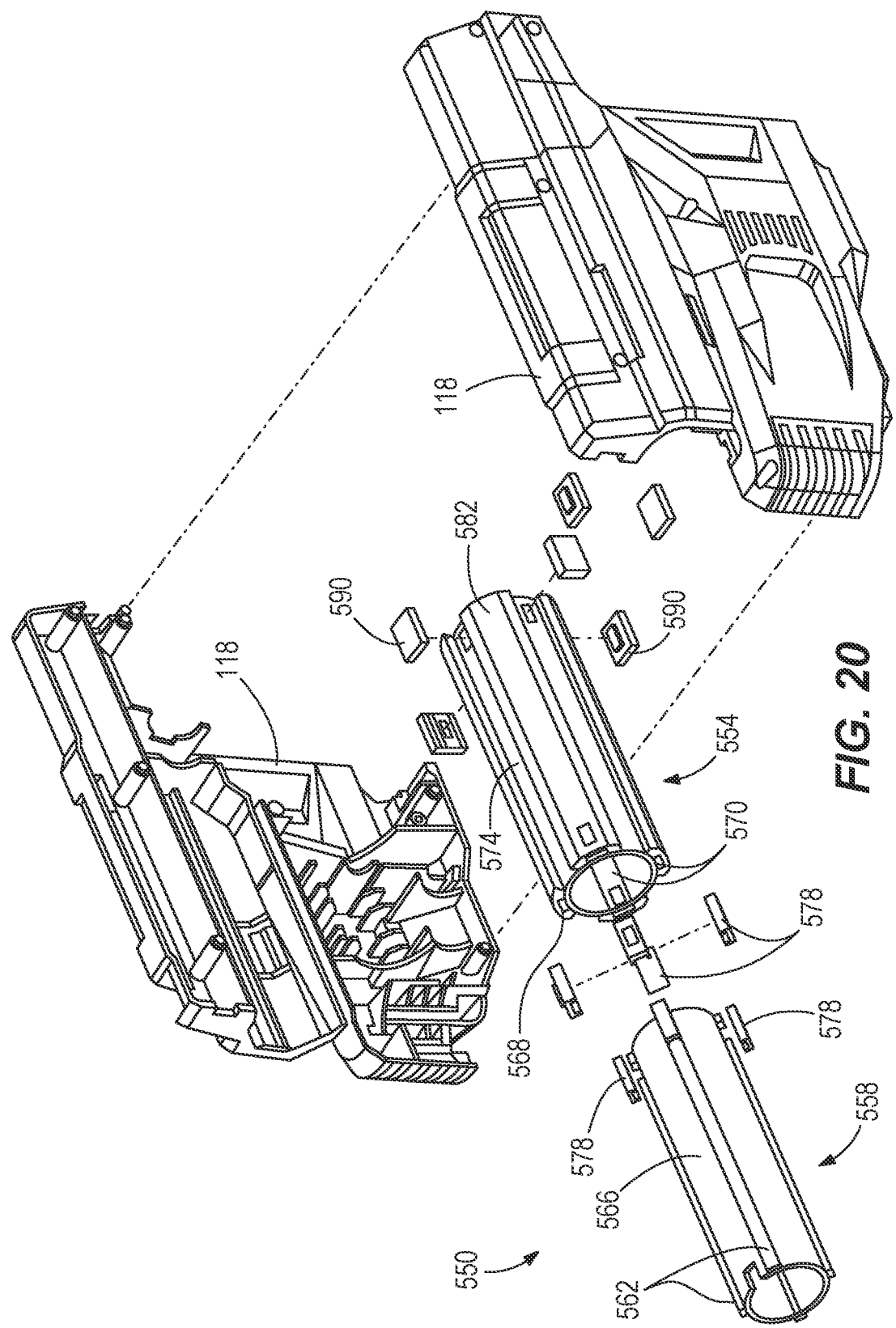
FIG. 20 is an exploded view of the suction pipe of FIG. 19.

FIGS. 19 and 20 illustrate another embodiment of a suction pipe 550. The suction pipe 550 includes an outer pipe 554 and an inner pipe 558. The suction pipe 550 is constructed to limit the deflection of the suction head 230 (not shown in FIG. 19) during use. The inner pipe 558 has a plurality of projections 562 extending radially outward from a main cylindrical body 566 of the inner pipe 558, and along the length of the inner pipe 558. Each of the plurality of projections 562 are configured to be received within one of a plurality of corresponding recesses 570 formed within a main cylindrical body 574 of the outer pipe 554, and extending along the length of the outer pipe 554. Tabs 578 are positioned between the projections 562 and the recesses 570 to couple the inner pipe 558 and the outer pipe 554 in a telescoping arrangement. The tabs 578 are positioned at or near the distal end of the outer pipe 554.

A plurality of projections 582 are formed along the length of the outer pipe 554 and extend radially outward from the main cylindrical body 574 of the outer pipe 554. Each of the projections 582 corresponds to one of the recesses 570 and is radially aligned with the underlying recesses 570 such that the underlying recess 570 extends into the corresponding projection 582. Each of the projections 582 includes a lip 586 for receiving a connector 590 that couples the outer pipe 554 to the housing 118 in a telescoping arrangement. In the illustrated embodiment, the projections 582 include a lip 586 on each side of the projection 582 to engage with a connector 590 on each side of the projection 582.

Accordingly, the suction pipe 550 illustrated in FIGS. 19-20 limits deflection of the inner pipe 558 relative to the outer pipe 554. In particular, the alignment between the inner pipe 558 and the outer pipe 554 is provided by engagement between the projections 562 on the inner pipe 558 and the tabs 578 positioned within the recesses 570 near the distal end of the outer pipe 554, rather than by the main cylindrical bodies 566, 574 of the inner pipe 558 and the outer pipe 554. Similarly, alignment of the outer pipe 554 with the housing 118 is provided by projections 582 on the outer pipe 554 with the connectors 590 on the housing 118. This eases manufacturing tolerances on extruded parts and uses features that are more easily controllable from a manufacturing standpoint. The illustrated embodiment of the suction pipe 550 includes four sets of projections 562 and recesses 570. However, in other embodiments, a greater or fewer number of projections 562 and recesses 570 may be utilized.

Figure 21:
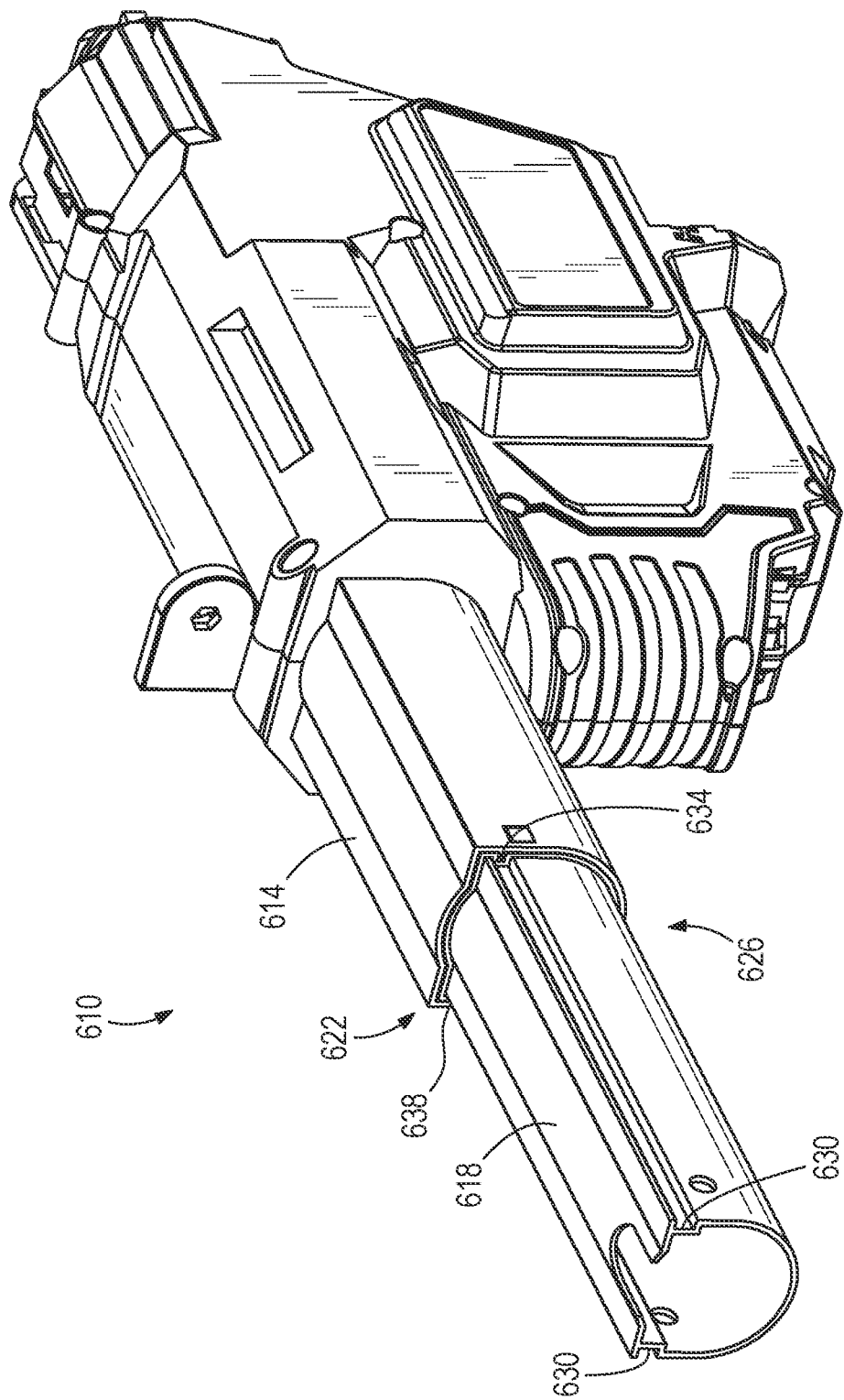
FIG. 21 is a perspective view of another embodiment of a telescoping suction pipe.
Figure 22:
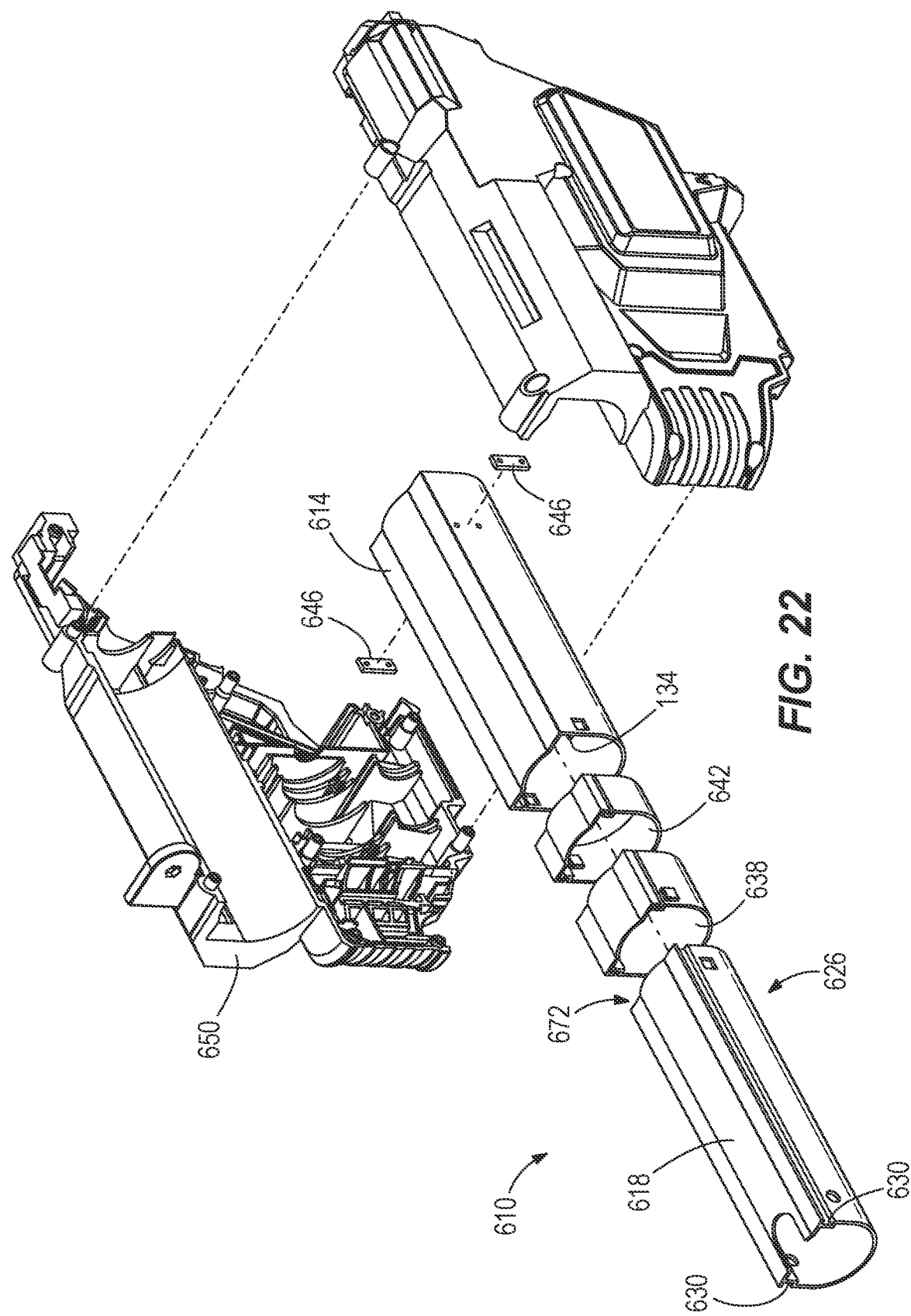
FIG. 22 is an exploded view of the suction pipe of FIG. 20.

FIGS. 21 and 22 illustrate another embodiment of a suction pipe 610 having an outer pipe 614 and an inner pipe 618 coupled together in a telescoping arrangement. The suction pipe 610 is configured to constrain the deflection between the outer pipe 614 and the inner pipe 618. The inner pipe 618 and the outer pipe 614 have a flattened top surface 622 and a rounded bottom surface 626. The inner pipe 618 includes a recess 630 extending along the length of the inner pipe 618. In the illustrated embodiment, the inner pipe 618 has two recesses 630 extending along the length of the inner pipe 618. The recesses 630 are positioned near the transition between the flattened top surface 622 and the rounded bottom surface 626. The outer pipe 614 includes two ribs 634 protruding radially inward and along the length of the outer pipe 614. The ribs 634 each correspond to the recesses 630 on the inner pipe 618. The outer pipe 614 and the inner pipe 618 are coupled together in a telescoping arrangement by a first bushing 638 and a second bushing 642. The first bushing 638 is coupled to the inner pipe 618 and the second bushing 642 is coupled to the outer pipe 614. The inner pipe 618 and the outer pipe 614 are assembled by pushing the inner pipe 618 through the outer pipe 614 from the rear end of the outer pipe 614. The suction pipe 610 is coupled to the housing 118 by two additional bushings 646. The bushings 646 are fixed to the outer pipe 614 and arranged to slide within a channel 650 formed by the housing 118.

Referring back to FIGS. 3 and 4, the suction head 230 of the dust collector 110 is coupled to the end of the suction pipe 122. The suction head 230 includes a hub 234, a hollow arm 238 extending from a side of the hub 234, and a shroud 242 coupled to the end of the arm 238. The shroud 242 defines a suction inlet 246 through which air is drawn during operation of the dust collector 110. In the illustrated embodiment of the dust collector 110, the arm 238 includes a first portion 243 integrally formed with the hub 234 and a second portion 244 integrally formed with the shroud 242. The second portion 244 is received in the first portion 243 and can be positioned at different depths within the second portion 244 in order to adjust the distance between the hub 234 and the shroud 242. The first portion 243 and the second portion 244 can be fixed relative to one another by way of a snap-fit, or an over center cam latch. By allowing the hub 234 and the shroud 242 to be moved toward or away from one another, the dust collector 110 can accommodate different size power tools 1.

When the suction inlet 246 is in contact with a workpiece during a drilling operation, the shroud 242 encloses a portion of the drill bit 12 and the surrounding region of the work piece to maintain the region at a sub-atmospheric pressure. In other words, the vacuum created in the suction pipe 122 and the suction head 230 draws dust and other debris generated during the drilling and/or hammering operation from the shroud 242, through the suction pipe 122, for depositing in the container 134. The suction head 230 may be attached to the suction pipe 122 in two different orientations to accommodate placement of the power tool 1 on both sides of the dust collector 110. A detent arrangement can be utilized to maintain the suction head 230 in either of the positions.

With reference to FIG. 6, the dust collector 110 may include an extension nozzle 266 removably coupled to the suction pipe 122 via the suction head 230. The extension nozzle 266 enables the power tool 1 to be used in constricted areas. In some embodiments, the nozzle may be formed as a single integral piece, while in other embodiments, the nozzle maybe formed by multiple pieces that are coupled together.

With reference to FIG. 7, the handle assembly 138 includes a handle portion 148, a head portion 150, and an adapter 152. The head portion 150 is configured to wrap around the neck of the power tool 1, and is adjustable to different sizes to accommodate power tools 1 with different sized necks 7. The adapter 152 is configured to clamp onto the housing 118 of the dust collector 110 to secure the handle assembly 138 to the dust collector 110. The handle assembly 138 thereby couples the power tool 1 to the dust collector 110. In the illustrated embodiment, the handle portion 148 includes a grip 160 and a threaded shaft 162. The head portion 150 includes an arcuate band 158 that forms a circular opening 168 for receiving the neck 7 of the power tool 1. The circular opening 168 formed by the arcuate band 158 can be constricted and expanded by rotating the handle portion 148. In particular, each end 156 of the band 158 extends through a slit in an end piece 164 of the handle portion 148. The ends 156 of the band 158 are then coupled to a bolt 166 that is axially slidable along the threaded shaft 162. As the handle portion 148 is rotated the bolt 166 is axially displaced along the threaded shaft 162 to either increase or decrease the size of the circular opening 168.

Figure 23:
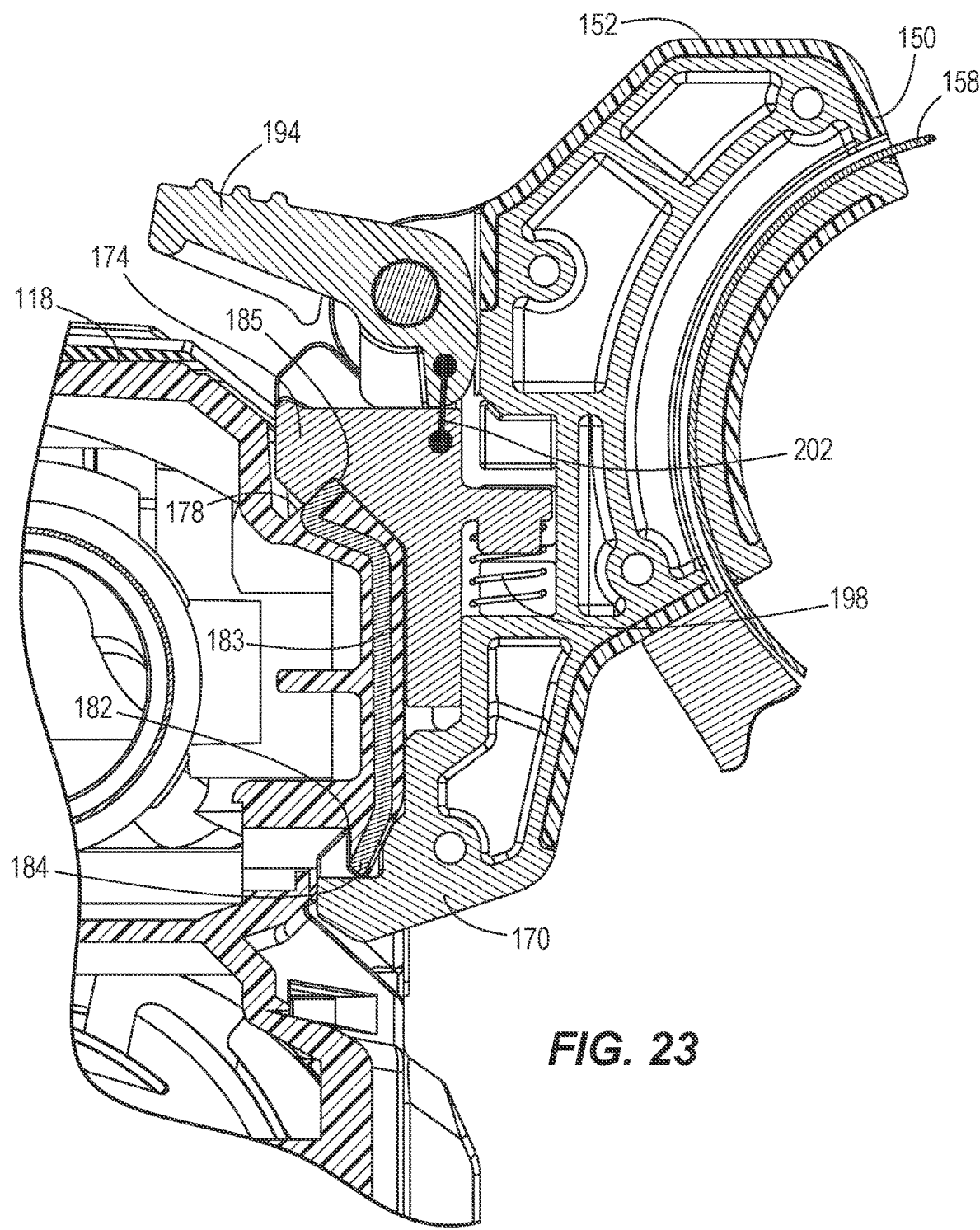
FIG. 23 is a partial cross sectional view of an adapter for attaching an auxiliary handle to the housing of any of the dust collectors of FIGS. 1-5 and 16.

With reference to FIG. 23, the adapter 152 includes a fixed clamp member 170 and an opposed, movable clamp member 174 for clamping the adapter 152 to either side of the housing 118. Particularly, the movable clamp member 174 is received within a first notch 178 in the housing 118, and the fixed clamp member 170 is received within a second notch 182 in the housing 118. The notches 178, 182 are defined in each side of the housing 118 to clamp the adapter 152 to either side of the housing 118. In the illustrated embodiment of the dust collector 110, a metal reinforcing plate 183 is insert molded with the housing 118 between the notches 178, 182 such that the clamp members 174, 170 engage bottom and top edges 184, 185 of the plate 183, respectively. Alternatively, the plate 183 may be omitted.

The adapter 152 also includes a lever 194 for actuating the movable clamp member 174 between an open position in which the movable clamp member 174 is received within the first notch 178 and engaged with the housing 118. The adapter 152 further includes a resilient member (e.g., a compression spring 198) that biases the movable clamp member 174 towards the fixed clamp member 170 and toward the clamped position. The lever 194 can be actuated to move the movable clamp member 174 to the open position. In the illustrated embodiment, the lever 194 can be rotated in a counter clockwise direction (as shown in FIG. 23), which pulls the movable clamp member 174 (via a linkage 202) against the bias of the spring 198. In one embodiment, the spring 198 deforms under less force than it takes to damage the material forming the notches 178, 182 on the housing 118. This ensures that when the dust collector 110 is dropped or otherwise impacted proximate the handle assembly 138, the adapter 152 disengages the housing 118 rather than breaking the portion of the housing 118 between the notches 178, 182.

Figure 24:
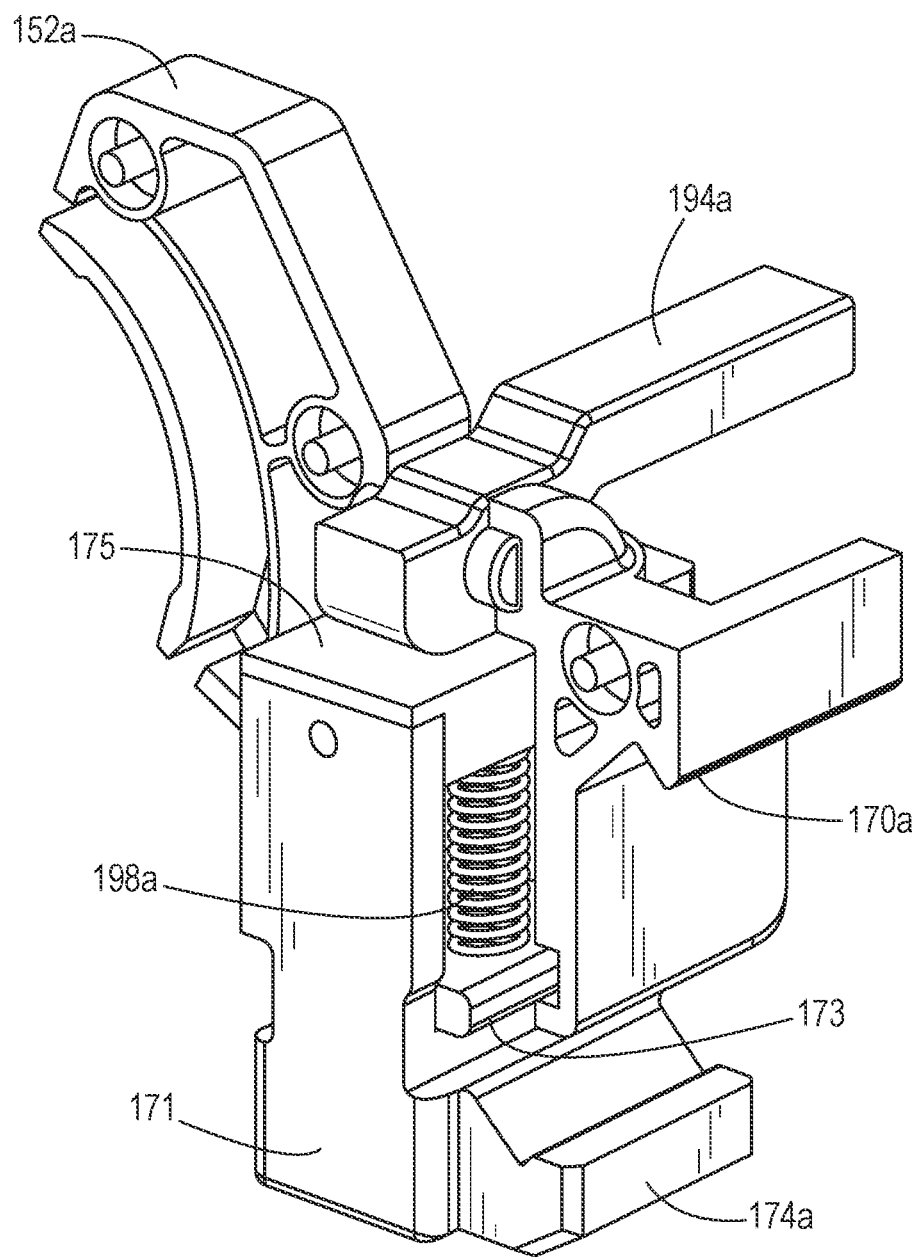
FIG. 24 is a perspective view of an adapter according to another embodiment.
Figure 25A:
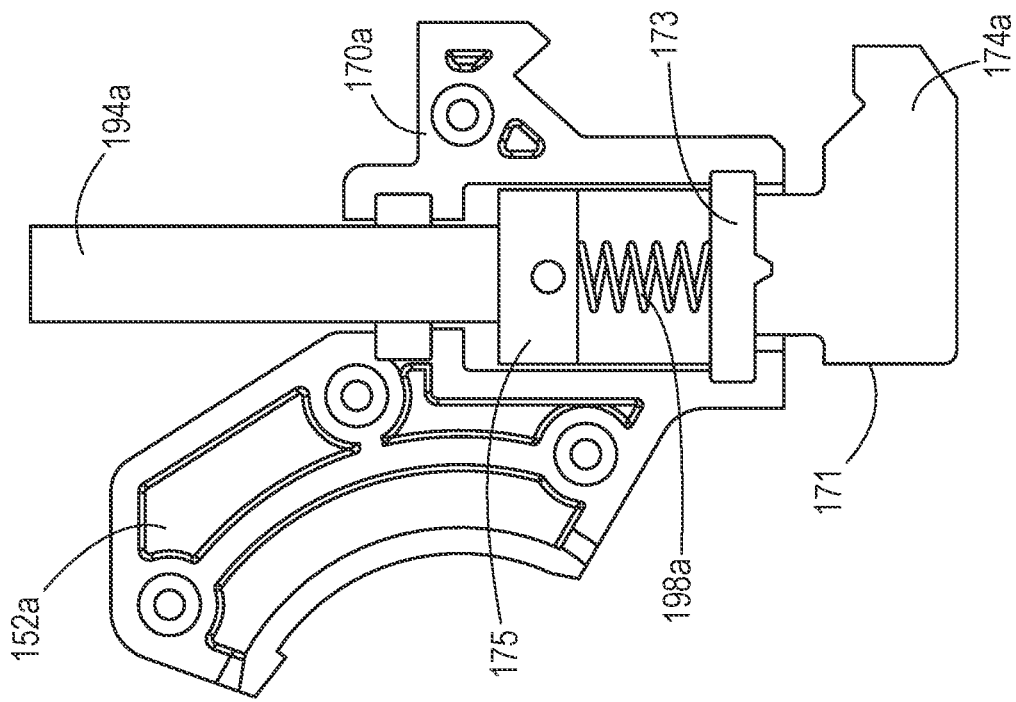
FIGS. 25A-25B are cross-sectional views of the adapter of FIG. 24 in a closed and an open position, respectively.
Figure 25B:
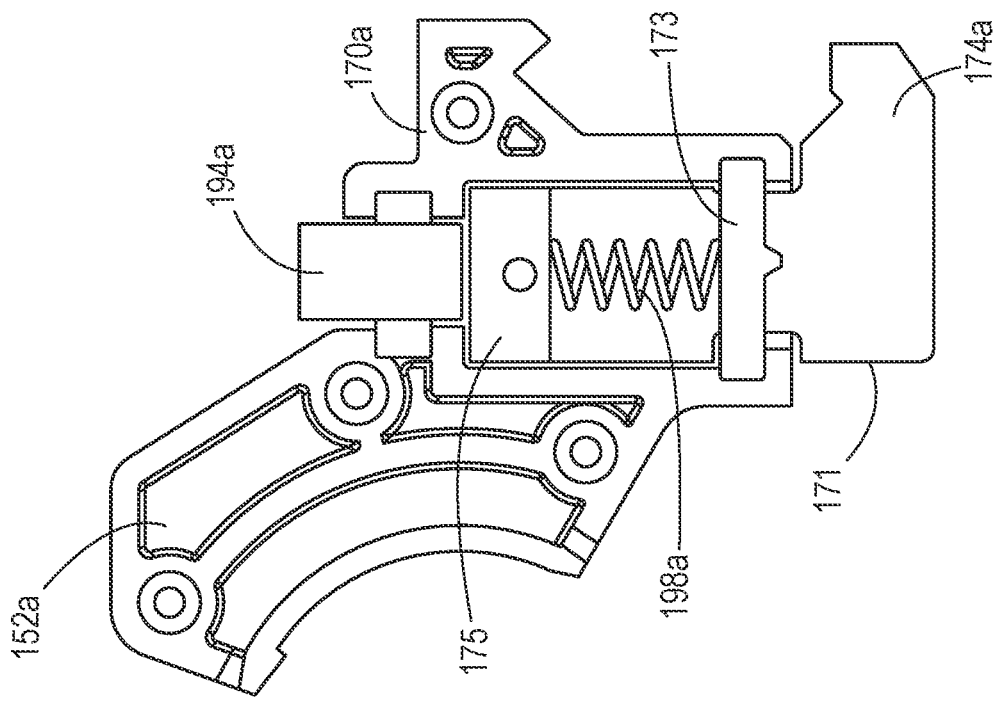

FIGS. 24 and 25A-25B illustrate an adapter 152a according to another embodiment. In the illustrated embodiment, the adapter 152a includes a fixed clamp member 170a and an opposed, movable clamp member 174a for clamping the adapter 152a to the housing 118. The movable clamp member 174a is received within the first notch 178 of the housing 118, and the fixed clamp member 170a is received within the second notch 182 in the housing 118. The adapter 152a also includes a lever 194a for actuating the movable clamp member 174a between an open position in which the movable clamp member 174a is received within the first notch 178 and engaged with the housing 118. The adapter 152a further includes a biasing member (e.g., a compression spring 198a) that biases the movable clamp member 174a towards the fixed clamp member 170a and toward the clamped position. The lever 194a can be actuated to move the movable clamp member 174a to the open position.

Specifically, the illustrated adapter 152a includes a sled body 171, a sled plate 173, and a sled clamp 175 that interact with the lever 194a and the biasing member 198a to adjust the adapter 152a between the open and closed positions. In the illustrated embodiment, the sled body 171 is integral with the movable clamp member 174a. The sled plate 173 is fixed to the fixed clamp member 170a. The sled body 171 and the sled clamp 175 are fixed to one another, and are movable with the movable clamp member 174a relative to the fixed clamp member 170a. The biasing member 198a is positioned between the sled clamp 175 and the sled plate 173 to bias the movable clamp member 174a towards the fixed clamp member 170a (e.g., upward in FIG. 24). When the lever 194a is rotated (e.g., counter clockwise in FIG. 24), the lever 194a cams against the sled clamp 175 to move the sled body 171 (e.g., downward in FIG. 24) and, thus, the movable clamp member 174a away from the fixed clamp member 170a. In other words, rotation of the lever 194a moves the sled clamp 175 towards the sled plate 173 and compresses the biasing member 198a to move the movable clamp member 174a towards the open position. FIG. 25A illustrates the adapter 152a in the closed position, and FIG. B illustrates the adapter 152a in the open position.

Referring back to FIGS. 3 and 4, the dust collector 110 includes a stop assembly 270 to help limit the axial movement of the suction pipe 122 in either the extended direction, the retracted direction, or both. In particular, the stop assembly 270 includes a plunge depth stop 274, which limits the extent to which the suction pipe 122 may retract into the housing 118, and in turn, limits the extent to which the drill bit 12 can plunge into the workpiece. The plunge depth stop 274 is movable along the length of a rail 278 and is selectively fixed to the rail 278 to limit the extent to which the suction pipe 122 may telescope relative to the housing 118. The stop assembly 270 also includes an extension stop 280, which limits the extent to which the suction pipe 122 may extend out of the housing 118. The extension stop 280 is moveable along the length of the rail 278 and can be selectively fixed to the suction pipe 122. This feature can be used to adjust the extension length of the suction pipe 122 to correspond to the size of the tool bit 12 being used. For example, when using a 4 inch tool bit 12, the extension length of the suction pipe 122 can be reduced to 4 inches to correspond to the length of the tool bit 12. If the extension length of the suction pipe 122 is not limited, then the end of the suction pipe 122 may extend far beyond the end of the tool bit 12.

In the illustrated embodiment, the rail 278 extends parallel to the suction pipe 122, and provides additional strength and rigidity to the suction pipe 122. In addition, the rail 278 may include a ruler (not shown). The ruler is movable with the depth stop 274. As such, the plunge depth of the suction tube 122 may be set with reference to markings on the ruler and a reference datum on the housing 118 (e.g., a line or edge on the front of the housing 118 surrounding the suction pipe 122). For example, should the user of the dust collector 110 and the power tool 1 desire to plunge the drill bit 12 only two inches into a workpiece, the user would slide the depth stop 274 relative to the suction tube 122 until the "2 inch" marking on the ruler is in alignment with the reference datum on the housing 118. Thereafter, the suction pipe 122 is limited to retracting only two inches into the housing 118 before the depth stop 274 contacts the housing 118 at which time further retraction of the suction pipe 122 is halted.

Figure 16:
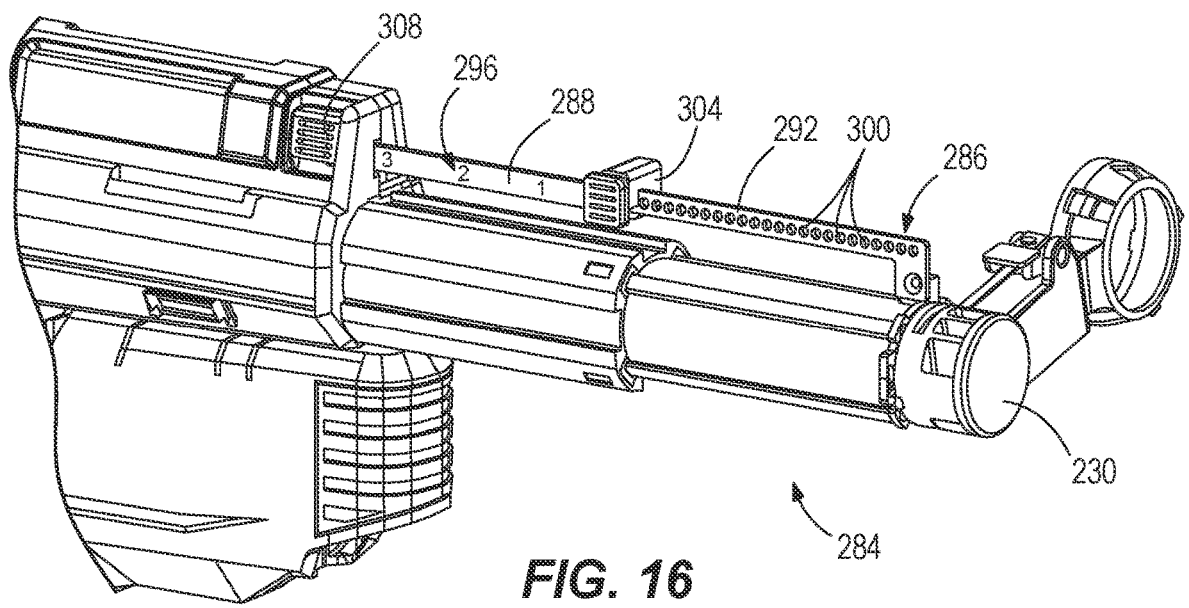
FIG. 16 is a perspective view of a dust collector according to another embodiment, including another embodiment of a stop assembly in a first arrangement.
Figure 17:
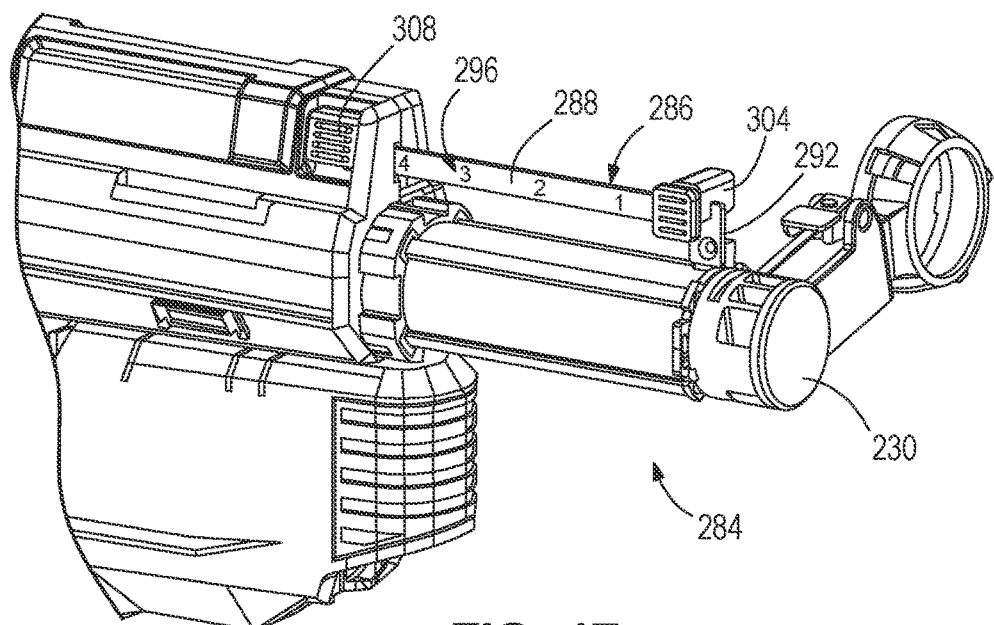
FIG. 17 is a perspective view of the stop assembly of FIG. 16 in a second arrangement.

FIGS. 16 and 17 illustrate another embodiment of a stop assembly 284. The stop assembly 284 includes a plunge depth stop 304 and an extension stop 308 having similar functionality as the plunge depth stop 274 and the extension stop 280 described above. Specifically, the plunge depth stop 304 limits the extent to which the suction pipe 122 may retract into the housing 118, and in turn, limits the extent to which the drill bit 12 can plunge into the workpiece. The extension stop 280 limits the extent to which the suction pipe 122 may extend from the housing 118, based upon a desired length of the tool bit 12. The illustrated stop assembly 284 further includes a rail 286 formed by a first flat bar 288 and a second flat bar 292. The first flat bar 288 and the second flat bar 292 are configured to slide (i.e., translate) relative to one another. The first flat bar 288 includes a ruler 296 for setting a plunge depth, and is movable with the plunge depth stop 304. The second flat bar 292 includes a series of holes 300 that are engagable by the plunge depth stop 304 and the extension stop 308 to set the plunge depth and the extension depth, respectively.

FIGS. 16 and 17 each illustrate examples of how the stop assembly 284 can be arranged to various plunge depths and extension depths. FIG. 16 illustrates the stop assembly 284 arranged to drill a three inch hole while using an 8 inch bit 12. The plunge depth stop 304 and the first flat bar 288 are moved together so that the three inch mark on the ruler 296 is aligned just outside the housing 118. In addition, the second flat bar 292 is extended beyond the plunge depth stop 304 in order to accommodate the length of an 8 inch bit 12. FIG. 17 illustrates the stop assembly 284 arranged to drill a 4 inch hole while using a 4 inch bit 12. The plunge depth stop 304 and the first flat bar 288 are moved together so that the four inch mark on the ruler 296 is aligned just outside the housing 118. The second flat bar 292 is aligned with the first flat bar 288 (i.e., it does not need to be extended beyond the first flat bar 288) because only a 4 inch bit 12 is intended for use in this arrangement.

Figure 18A:
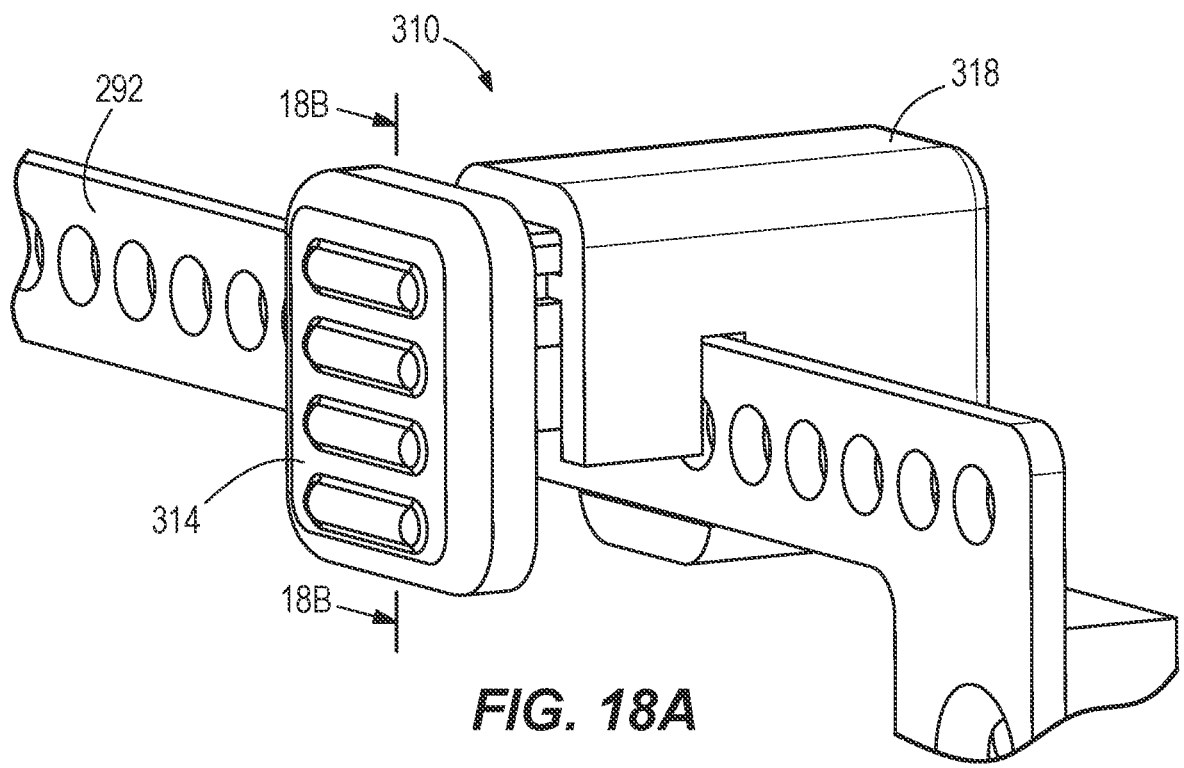
FIG. 18A is a perspective view of a stop mechanism according to one embodiment.
Figure 18B:
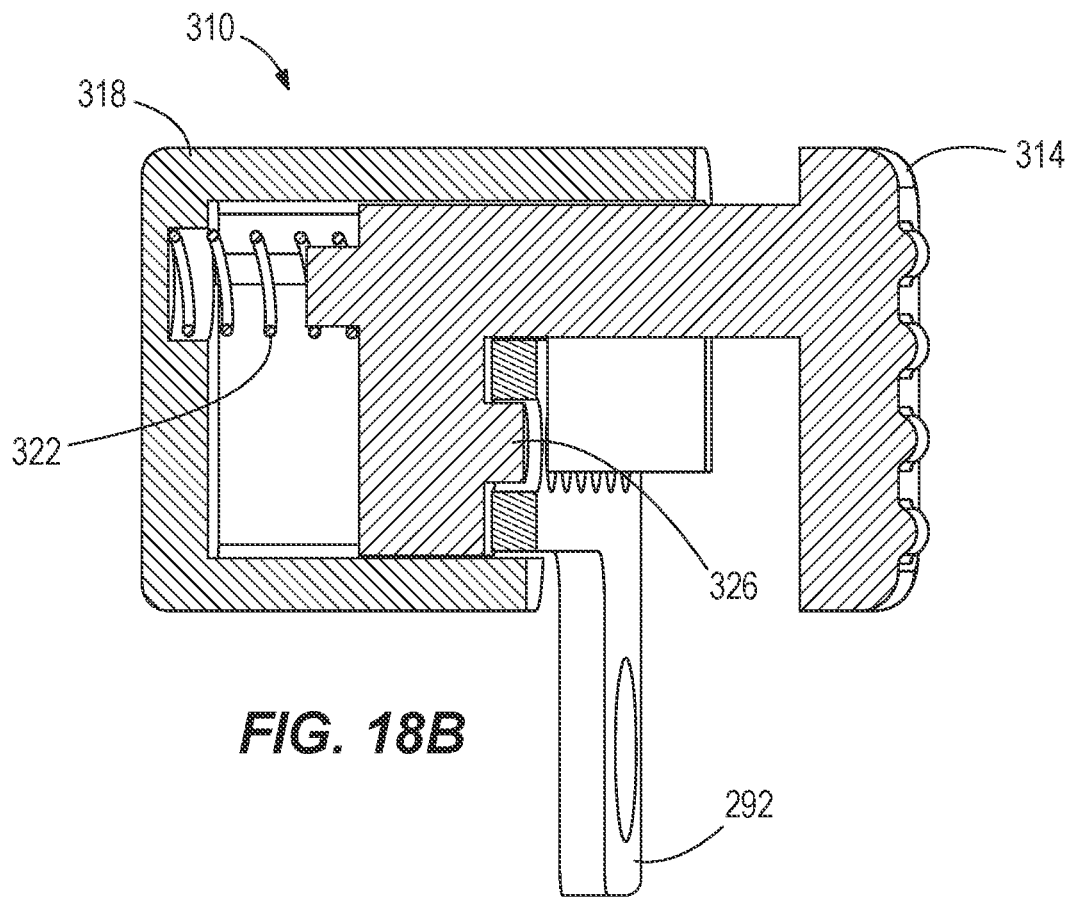
FIG. 18B is a cross-sectional view of the stop mechanism of FIG. 18A taken along line 18-18.

FIGS. 18A and 18B illustrate one embodiment of a stop mechanism 310 that can be used as the plunge depth stop 304 or the extension stop 308. The stop mechanism 310 includes a first portion (e.g., button 314) and a second portion (e.g., housing 318) having a slot in which the second flat bar 292 is partly received. The button 314 is partially received within the housing 318, and moveable relative thereto. In the default position, the button 314 is biased toward the second flat bar 292 by a spring 322 in order to clamp the housing 318 onto the second flat bar 292. When in the default position, a projection 326 extending from the button 314 engages with one of the holes 300 in the second flat bar 292, for example, to set the plunge or extension depth of the suction pipe 122. To readjust the stop mechanism 310 to a different position along the second flat bar 292, a user can press the button 314 against the bias of the spring 322 to remove the projection 326 from the hole 300 and realign the stop mechanism 310 with a different hole 300. As mentioned above the first flat bar 288 is attached to the housing 318 for movement therewith relative to the second flat bar 292 to set the plunge depth of the suction tube 122.

Figure 8:
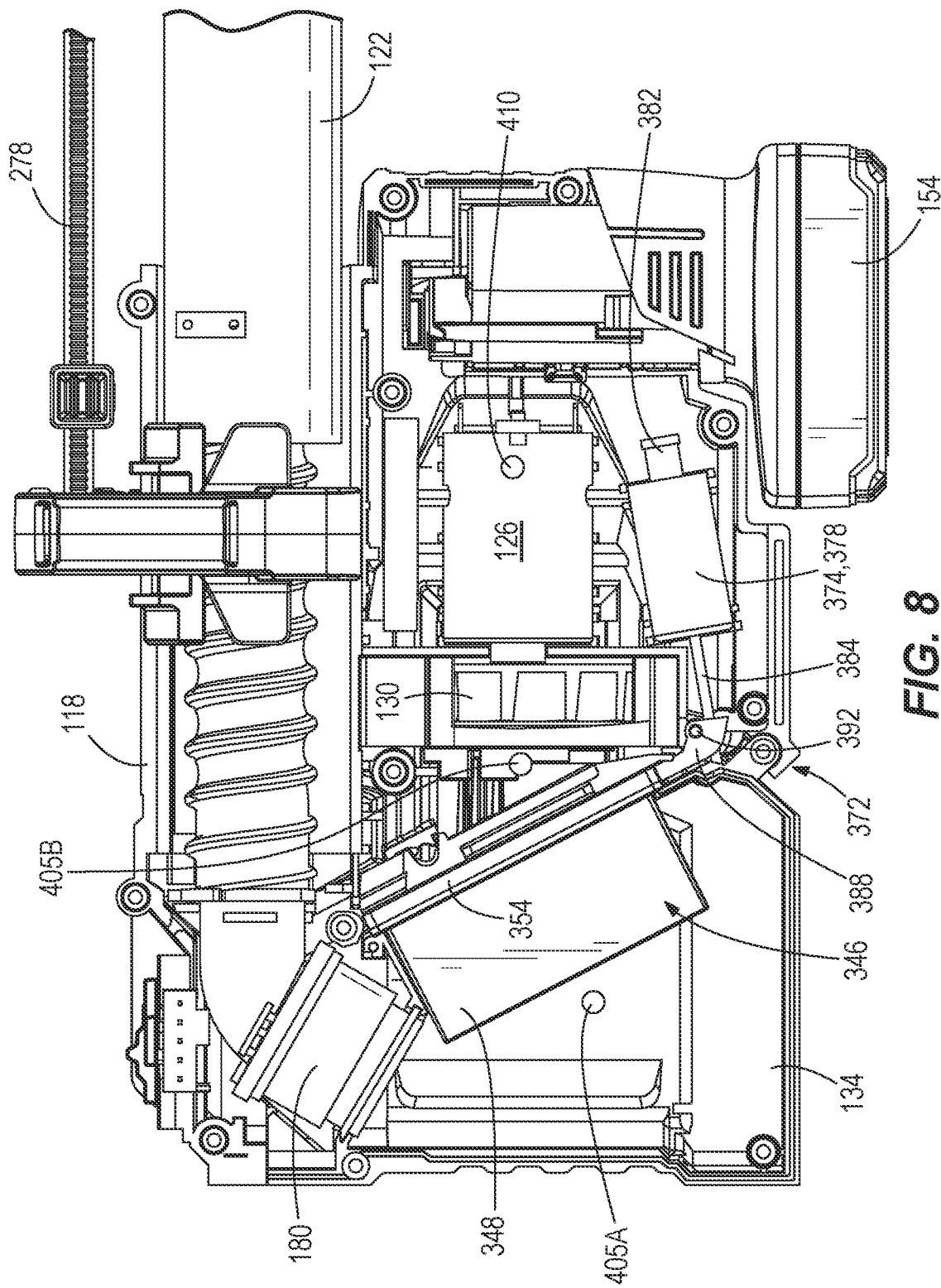
FIG. 8 is a partial cross-sectional view of the dust collector of FIG. 3.
Figure 9:
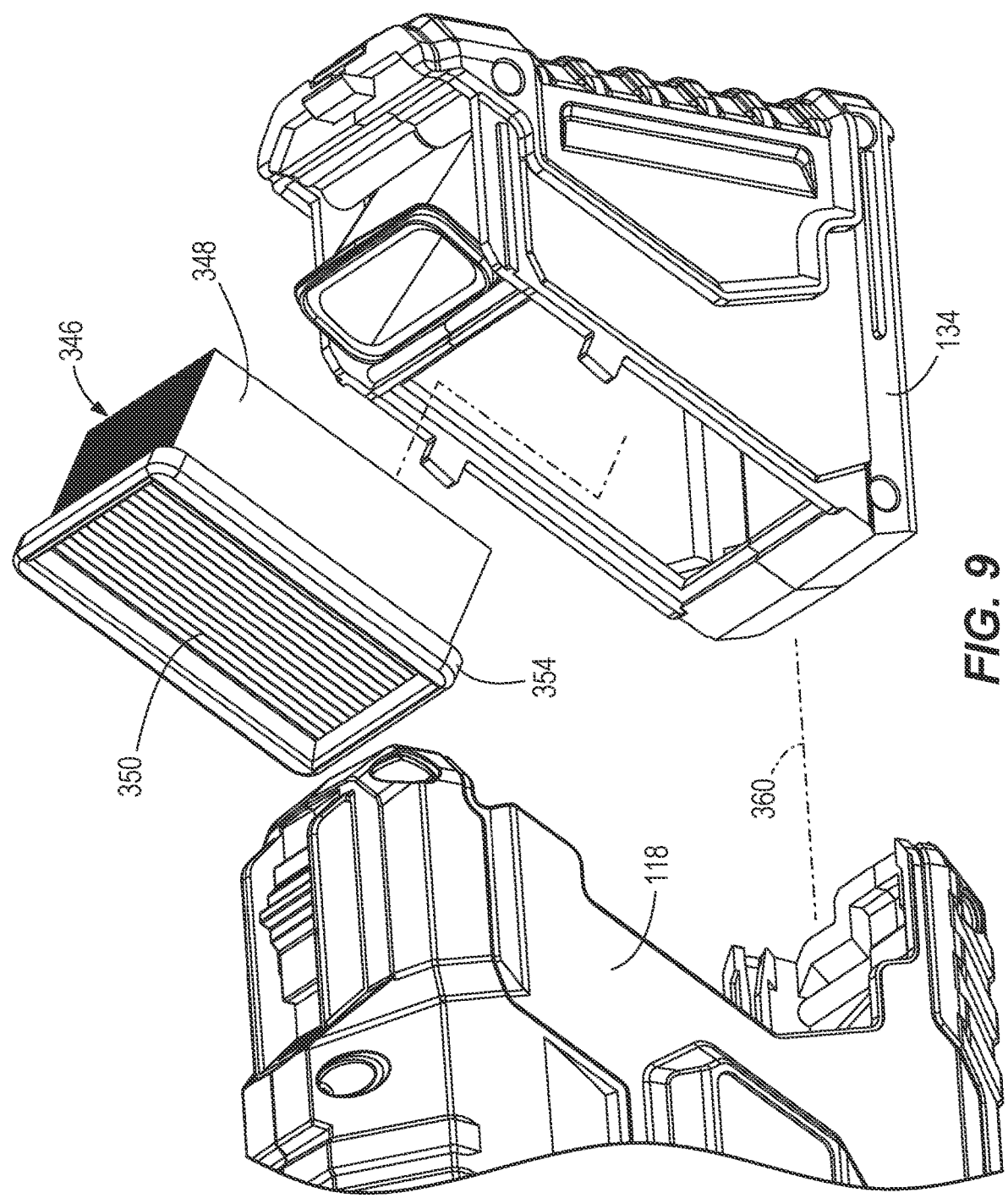
FIG. 9 is an enlarged, exploded perspective view of the dust collector of FIG. 3, illustrating a dust container and a filter.

With reference to FIGS. 8 and 9, the dust collector 110 includes a filter 346 supported by at least one of the housing 118 and the dust container 134. In the illustrated embodiment of the dust collector 110, the filter 346 includes a housing 348, a pleated element 350 within the housing 348, and a rim 354 surrounding the pleated element 350. The rim 354 is trapped between the dust container 134 and the housing 118 when the dust container 134 is attached to the housing 118. Alternatively, the dust collector 110 may incorporate additional structure for securing the filter 346 to the dust container 134 prior to the dust container 134 being attached to the housing 118. When the dust container 134 is removed from the housing 118, the filter 346 is accessible and removable from the dust container 134 for servicing and/or replacement by merely pulling the filter 346 (by, for example, grasping the rim 354) from the dust container 134 after the dust container 134 has been removed or detached from the housing 118. The filter 346 may be configured as a high efficiency particulate air ("HEPA") filter 346.

The filter 346 is oriented within the dust container 134 in an inclined or an oblique manner relative to an axis 360 of the dust collector 110. As such, it is expected that at least a portion of the filter 346 will remain exposed when the dust container 134 is nearly filled with dust, regardless of the orientation of the dust collector 110 while in use. Particularly, the pleated element 350 of the filter 346 extends into the interior of the dust container 134, and at least a portion of the pleated element 350 is expected to remain exposed when the dust container 134 is nearly filled with dust, regardless of the orientation of the dust collector 110 while in use. Optionally, the dust collector 110 may include a secondary filter (e.g., a porous plate, a screen, etc.) positioned between the fan 130 and the filter 346 to inhibit particles that may have bypassed the filter 346 from being impacted by the fan 130. Furthermore, the secondary filter may help protect the fan 130 when the dust container 134 is not connected to the dust collector 110. Such a secondary filter may be permanently affixed to the housing 118 and non-removable from the housing 118. Such a secondary filter may also include a fine pore size, such that any particles bypassing both the filter 346 and the secondary filter are sufficiently small to not damage the fan 130.

Figure 10:
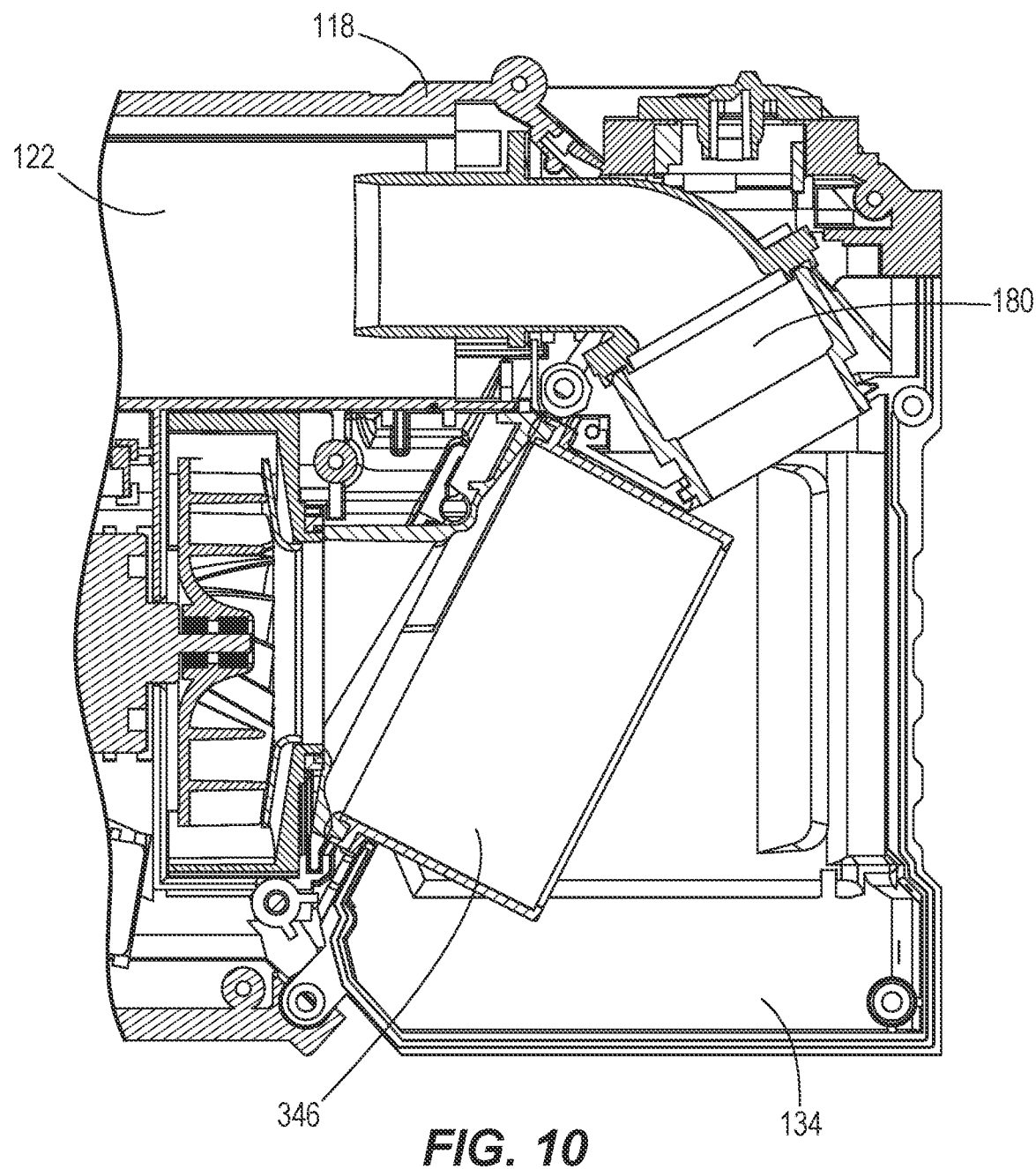
FIG. 10 is a cross-sectional view of a vacuum hose adapter for use with any of the dust collectors of FIGS. 1-5.

With reference to FIG. 10, the dust collector 110 may include a vacuum hose adapter 180 configured to connect to an external vacuum source (not shown). Typically, the dust is sucked through the suction pipe 122 and is collected in a dust container 134. The dust container 134 can then be removed to empty the dust container 134. However, when excessive amounts of dust are being dispelled into the dust container 134, a user will have to repeatedly remove the dust container 134, interrupting their productivity. Therefore, the vacuum hose adapter 180 may be attached to the end of the suction pipe 122, so that the dust container 134 can be removed and a hose from an external vacuum source can be attached to the vacuum hose adapter 180. This allows for a large vacuum source, such as a portable shop vacuum, to be used with the power tool 1 via the dust collector 110. In the illustrated embodiment, the vacuum hose adapter 180 can be threadably coupled to the hose. In other embodiments, other types of connections can be used to couple the end of the suction pipe 122 to a vacuum hose.

Figure 11:
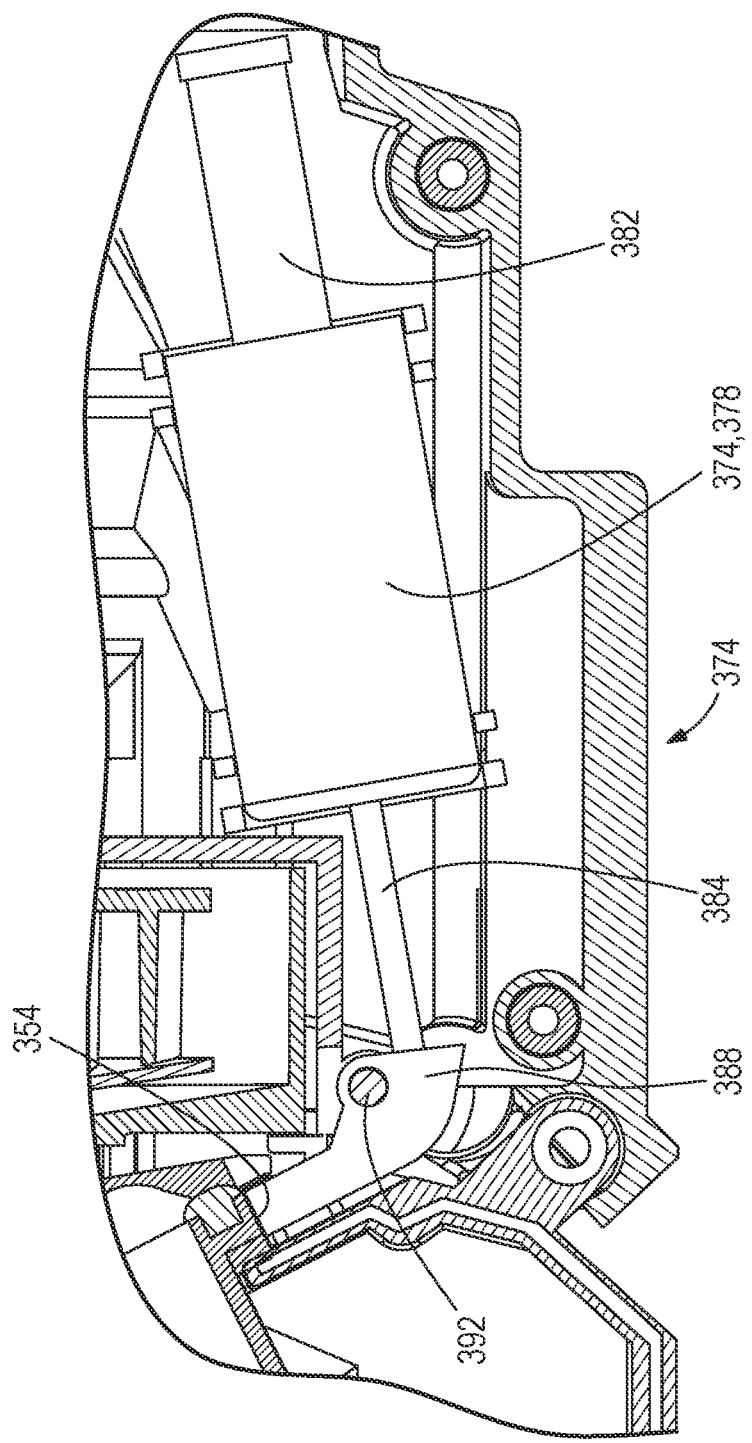
FIG. 11 is an enlarged view of a first embodiment of a filter cleaning mechanism for use with any of the dust collectors of FIGS. 1-5.

Furthermore, the dust collector 110 may include a filter cleaning mechanism configured to knock dust off of the filter 346. With reference to FIGS. 8 and 11, in one embodiment, a filter cleaning mechanism 372 is automatically actuated when the fan 130 of the dust collector 110 transitions from an active state to an inactive state. A controller (not shown) controls an actuator 374 to strike or impact the filter 346 to shake debris from the filter 346. Triggering of the actuator 374 may be based on detection of inactivity of the fan 130 or inactivity of the motor 126. As used herein, the fan 130 transitions from the active state to the inactive state when the fan 130 stops rotating, or when the fan 130 slows to a rotational speed below a predetermined threshold such that the airflow induced by the fan 130 has effectively stopped. The controller may monitor an indicator of the rotational state of the fan 130. In some embodiments, the controller may be configured to monitor the rotation of the fan 130 by using a Hall-effect sensor for directly detecting the rotational speed of the fan 130 (e.g., by using a magnet that rotates with the fan 130). In another embodiment, the fan 130 transitions from the active state to the inactive state when the motor 126 is no longer transmitting a rotational force to the fan 130. Similarly, the motor 126 can transition from an active state to an inactive state when the motor 126 stops rotating or when the motor 126 slows to a predetermined threshold of rotational speed. For example, the controller may monitor a sensor that detects the voltage or current applied to the motor 126 to determine whether the motor 126 has transitioned from the active state (i.e., providing torque to the fan 130) to the inactive state.

Figure 12A:
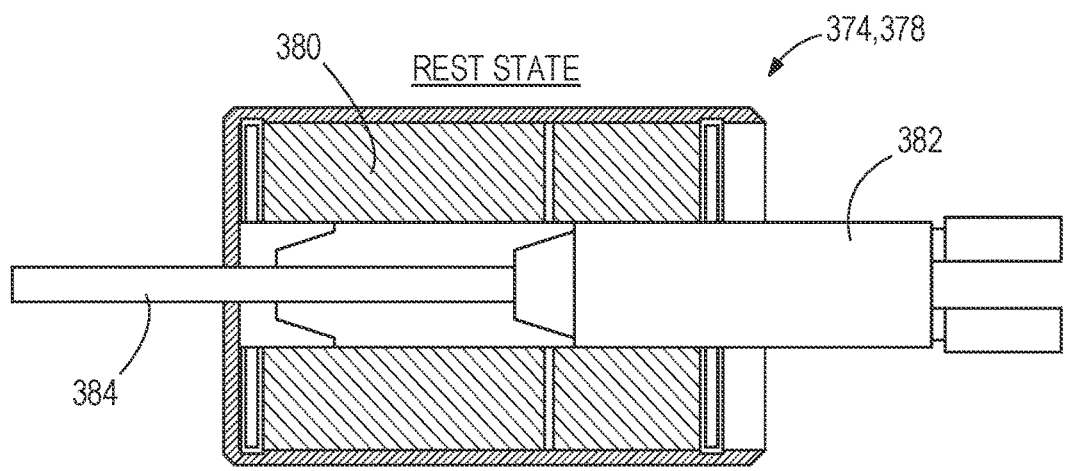
FIGS. 12A and 12B are plan views of a solenoid of the filter cleaning mechanism of FIG. 11.
Figure 12B:
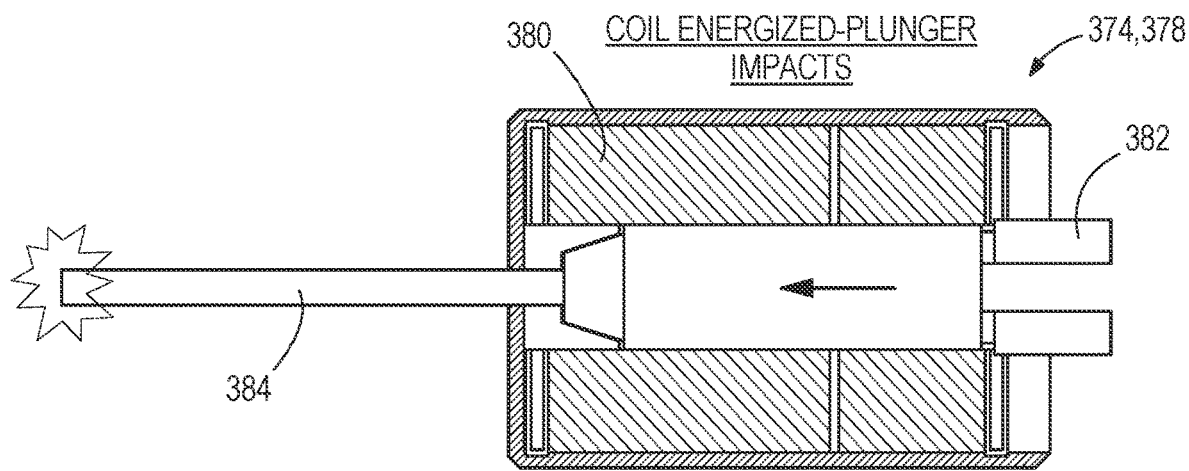

In the illustrated embodiment, the actuator 374 is a solenoid 378 that can be actuated to strike the filter 346 and shake dust from the filter 346. As shown in FIGS. 12A and 12B, the solenoid 378 includes a coil 380, a plunger 382 arranged to slide within the coil 380, and a pin 384 on the end of the plunger 382. When the controller detects that the fan 130 has transitioned from the active state to the inactive state, the controller energizes the coil 380 of the solenoid 378 to move the plunger 382 and the pin 384 from a first position (shown in FIG. 12A) to a second position (shown in FIG. 12B). Specifically, FIG. 12A illustrates the solenoid 378 in a rest state and FIG. 12B illustrates the solenoid 378 in an energized state. When the controller fires the solenoid 378, the pin 384 rotates a bell crank 388 (FIG. 8), which, in turn, impacts with the filter 346 and knocks off dust. In some embodiments, the bell crank 388 may not rotate, but instead may transfer the force from the solenoid 378 to the filter 346 without rotating. In particular, the bell crank 388 is rotatable about a pivot 392, such that when the pin 384 engages the bell crank 388, the bell crank 388 rotates and engages with the rim 354 of the filter 346. In some embodiments, the solenoid 378 may be energized by the controller to impact the filter 346 three times over a one second time period.

Notably, in the embodiment illustrated in FIG. 11, the bell crank 388 is arranged to contact the rim 354 of the filter 346 in a direction parallel to the face of the filter 346 (i.e., parallel to the plane of the pleated element 350). By impacting the filter 346 in a direction parallel to face of the filter 346, force is concentrated in removing dust from the pleated element 350. Accordingly, less force is wasted as being absorbed into the housing 348 of the filter 346, as compared to the bell crank 388 impacting the filter 346 in a direction perpendicular to the face of the filter 346.

Figure 13:
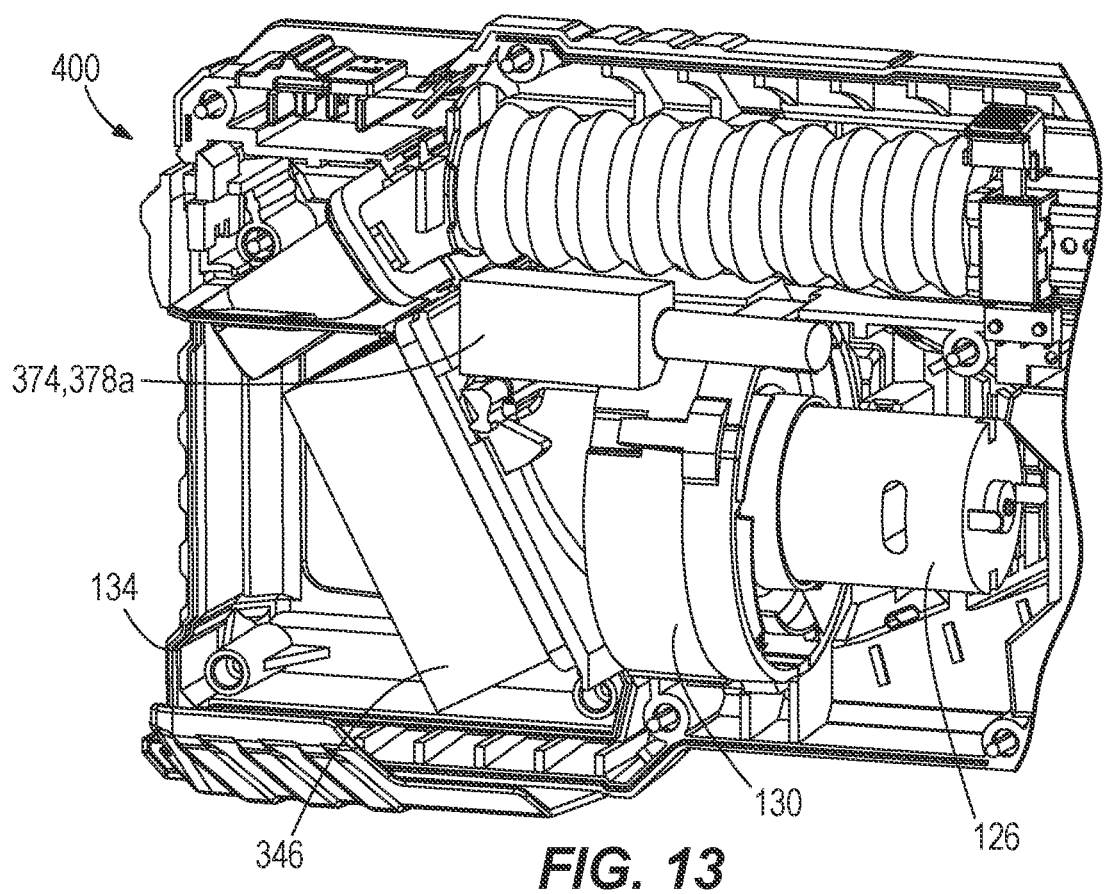
FIG. 13 is a partial cross-sectional view of a second embodiment of a filter cleaning mechanism for use with any of the dust collectors of FIGS. 1-5.

However, in some embodiments, it may be desirable to arrange the actuator 374 to engage the front face of the filter 346. For example, FIG. 13 illustrates a more simplistic filter cleaning mechanism 400. In this embodiment, the filter cleaning mechanism 400 has fewer elements, and a solenoid 378a is arranged to make direct contact with the filter 346. In other words, the filter cleaning mechanism 400 does not include a bell crank to impart the force from the solenoid 378a to the filter 346.

Figure 14:
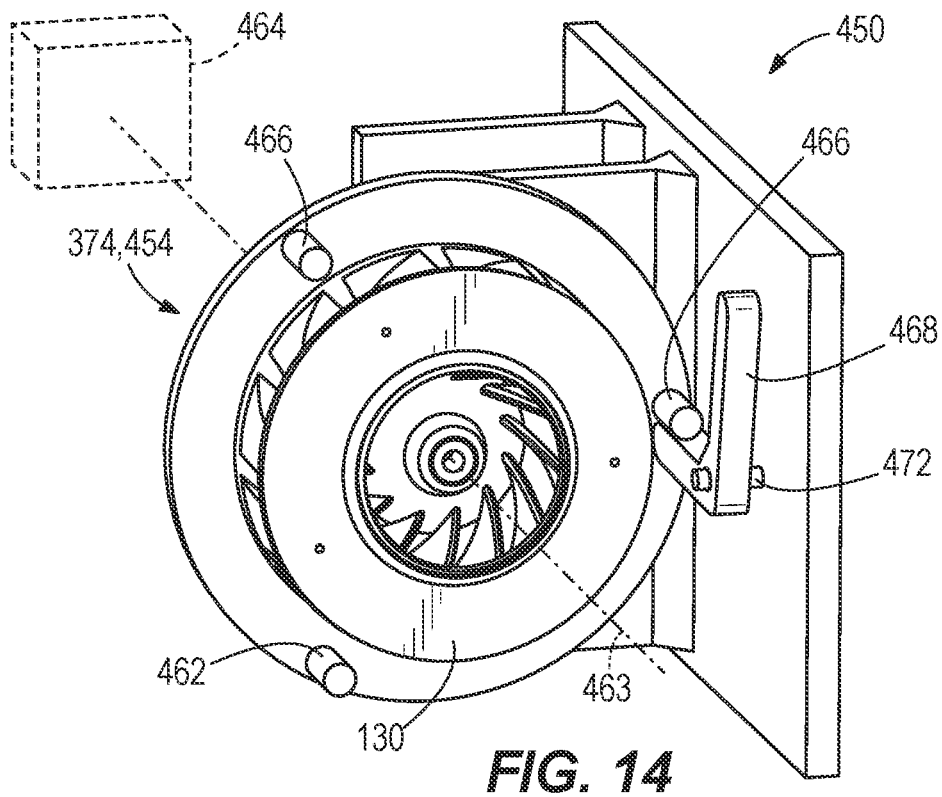
FIG. 14 is a perspective view of a third embodiment of a filter cleaning mechanism for use with any of the dust collectors of FIGS. 1-5.

FIG. 14 illustrates a filter cleaning mechanism 450 according to yet another embodiment. In the illustrated embodiment, the actuator 374 is in the form of a clutch bearing 454 (i.e., a one-way bearing) located between the shaft of the motor 126 and a rotatable plate 462 having a plurality of cogs 466. Under normal operation, the motor 126 and the fan 130 rotate about a rotational axis 463 in a first direction (i.e., in a counter clockwise direction in FIG. 14). When rotating in the first direction, the torque from the motor 126 is not transferred to the plate 462. However, once the fan 130 transitions from the active state to the active state (i.e., slows to a stop or slows to below a predetermined threshold speed), the motor 126 is configured to pulse in a second, or a reverse direction (i.e., in a clockwise direction in FIG. 14). Due to the effect of the clutch bearing 464, torque is transferred to the plate 462 when the motor 126 pulses in the reverse direction. The cogs 466 extending from the plate 462 sequentially engage a linkage 468, which in turn, impacts the filter 346. In the illustrated embodiment, the linkage 468 rotates about a pivot 472. Similar to the bell crank 388, the linkage 468 can be arranged to impact the rim 354 of the filter 346 in a direction parallel to the face of the filter 346 (i.e., parallel to the plane formed by the rim 354).

Figure 15:
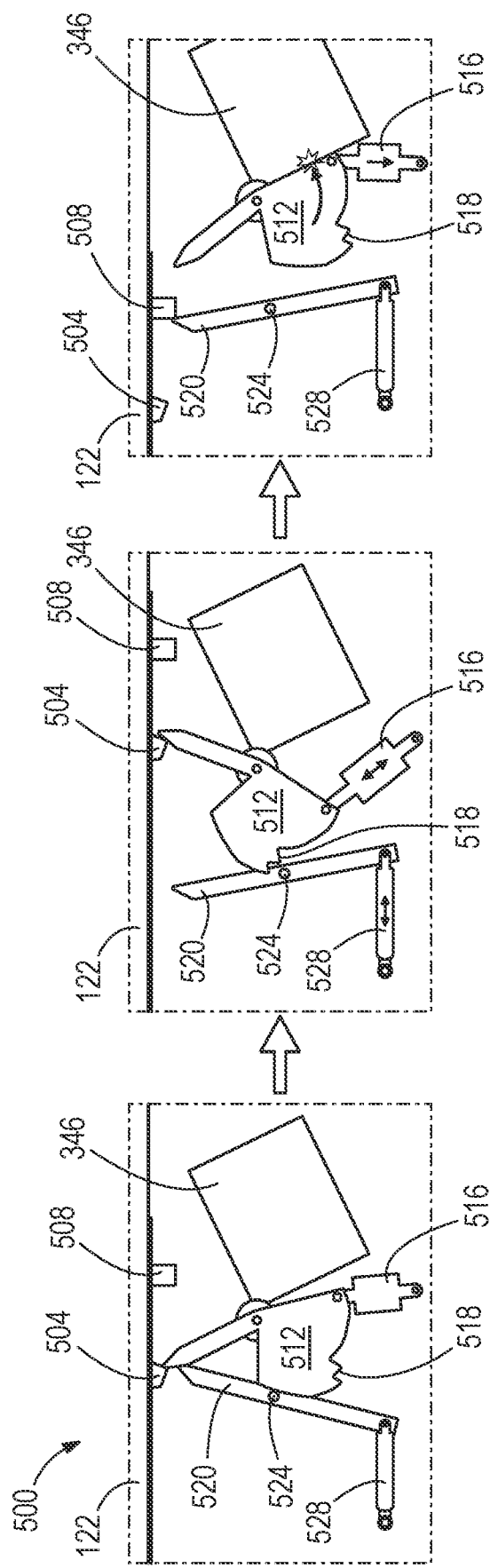
FIGS. 15A-15C are plan views of a fourth embodiment of a filter cleaning mechanism for use with any of the dust collectors of FIGS. 1-5.

FIGS. 15A-15C illustrate yet another embodiment of a filter cleaning mechanism 500. Specifically, in the sequenced images of FIGS. 15A-15C illustrate the filter cleaning mechanism 500 in a neutral position (FIG. 15A), a ready or a loaded position (FIG. 15B), and an actuated or a released position (FIG. 15C). The suction pipe 122 includes a pair of projections 504, 508 extending from a lower surface of the suction pipe 122. When the suction pipe 122 is extended out of the housing 118 of the dust collector 110 from the neutral position (FIG. 15A) to the ready position (FIG. 15B), the first projection 504 engages with a hammer 512 to rotate the hammer 512 in a first direction (i.e., clockwise in FIGS. 15A-15C). Specifically, the hammer 512 is rotated against the force of a hammer spring 516. An underside of the hammer 512 includes a locking slot 518 configured to receive a trigger 520 which holds the hammer 512 away from the filter 346 against the urging of the hammer spring 516. In particular, the hammer 512 includes a V-shaped locking slot 518 that engages with a pin 524 extending from the trigger 520. The rotation of the hammer 512 against the hammer spring 516 bias places the hammer in a "loaded position."

During operation of the power tool 1, the suction pipe 122 retracts into the housing 118 of the dust collector 110 (i.e., towards the right in FIGS. 15A-15C). Once the user finishes drilling, the suction pipe 122 returns to its initial position (towards the left in FIGS. 15A-15C). As the suction pipe 122 returns, the second projection 508 on the underside of the suction pipe 122 engages the trigger 520, causing it to pivot about an axis and remove the pin 524 from the slot 518, thus disengaging the hammer 512 from the trigger 520 and releasing the hammer 512 so it can pivot from the loaded position (FIG. 15B) to the actuated position (FIG. 15C). The force of the hammer spring 516 pulls the hammer 512 toward the filter 346 and the hammer 512 strikes the filter 346, knocking dust off of the filter 346. A trigger spring 528 then biases the trigger 520 back to its original position, as shown in FIG. 15A.

Accordingly, several of the filter cleaning mechanisms provided herein are automatic filter cleaning mechanisms, which are actuated automatically without involvement of the user. In other embodiments, a manually loaded filter cleaning mechanism may be used, wherein a user provides the loading force on an actuator configured to knock dust off of the filter 346. Similarly, in other embodiments, the actuator may be mechanically loaded. For example, the actuator of the filter cleaning mechanism may be mechanically loaded by air diverted by a separate mechanical mechanism. In yet another embodiment, the actuator of the filter cleaning mechanism may be actuated upon timing intervals measured during the duration of time that the power tool is in operation.

Furthermore, in some embodiments, the dust collector 110 includes a monitoring system that monitors the air flow through the dust collector 110 to detect obstructions or clogs in the filter 346. For example, as shown in FIG. 8, the dust collector 110 may include one or more sensors 405A, 405B that measure a characteristic value of the airflow to identify changes in the air flow velocity upstream and/or downstream of the filter 346. For example, in one embodiment of the monitoring system, the sensor 405B detects the pressure of the space between the filter 346 and the fan 130. A pressure value below a predetermined threshold would indicate a higher than expected vacuum drawn by the fan 130, thus indicating that an obstruction exists (i.e., that the filter 346 is clogged beyond an acceptable limit). In another embodiment of the monitoring system, the output of the sensors 405A, 405B may be used to calculate a pressure differential on the opposite sides of the filter 346. Then, a pressure differential value above a predetermined threshold would indicate a higher than expected vacuum drawn by the fan 130, thus indicating that the filter 346 is clogged beyond an acceptable limit. In other embodiments, the sensors 405A, 405B may measure the speed of the airflow upstream and/or downstream of the filter 346. In this embodiment the sensors 405A, 405B may be, for example, Venturi meters. In an embodiment only using the sensor 405B, a detected airflow speed below a predetermined threshold would indicate a higher than expected vacuum drawn by the fan 130, thus indicating that the filter 346 is clogged beyond an acceptable limit. And, in an embodiment using both sensors 405A, 405B, the output of the sensors 405A, 405B may be used to calculate a differential in the air speed on the opposite sides of the filter 346. Then, an air speed differential value above a predetermined threshold would indicate a higher than expected vacuum drawn by the fan 130, thus indicating that the filter 346 is clogged beyond an acceptable limit.

If the pressure or the air flow velocity drop below a predetermined threshold, or the pressure or air speed differential exceed a predetermined threshold, the controller may inform a user that air flow through the filter 346 has been reduced. For example, the controller may initiate an audible notification, such as a beep or other noise indicating there may be an obstruction. The controller may provide a visible notification, such as a flashing light, or any other type of notification, such as tactile or otherwise, indicating there may be an obstruction in or around the filter 346. In some embodiments, the monitoring system utilizes multiple predetermined threshold values to indicate the severity of the obstruction. For example, in one embodiment, when the characteristic value detected by the sensors 405A, 405B (i.e., pressure or air speed) drops below a first predetermined threshold, the controller may initiate a single audible noise, or may provide a certain color light (e.g., blue) to inform the user that there may be a small obstruction on the filter 346. Then, when the characteristic value detected by the sensors 405A, 405B drops below a second predetermined threshold, the controller may initiate multiple audible noises, or may provide a different color light (e.g., red) to inform the user that there may be a larger obstruction.

With continued reference to FIG. 8, in some embodiments, the monitoring system may include a sensor 410 to monitor changes in the current drawn by the electric motor 126 driving the fan 130. As the filter 346 becomes blocked, the fan 130 will not be able to move as much air across the filter 346 and will be doing less work. This results in a reduced current being drawn by the electric motor 126. In other words, when the filter 346 is blocked, there is no air for the fan 130 to move and a near-vacuum state is formed in proximity of the fan 130. Accordingly, the fan 130 is spinning within a space with little air resistance, thus causing the fan 130 to draw a current that is lower than the normal load. Therefore, a lower current drawn by the electric motor 126 indicates the existence of an obstruction. The sensor 410 monitors the current drawn by the electric motor 126 to identify a drop in current below a predetermined threshold corresponding to a clogged or partially clogged filter 346. In some embodiments, the monitoring system may use input from all, or different combinations, of the sensors 405A, 405B, 410 to detect that the filter 346 is clogged beyond an acceptable limit.

Similar to the monitoring system described above using input from the sensors 405A, 405B, the monitoring system that uses input from the sensor 410 may also provide staged notifications to the user when the sensor 410 identifies a possible obstruction or clog in the filter 346. When the current drops below a predetermined threshold, the controller may indicate via audible or visual cue that there has been a change in current and that the filter 346 may be clogged.

As will be understood by a person of ordinary skill in the art, the monitoring system may also be used with power tools having on board vacuum systems. For example, the dust collection system may be housed within the power tool housing. Accordingly, the power tool may have a on board dust collection system that includes the monitoring system described above. Likewise, the filter cleaning mechanisms described herein may also be used with power tools having on board vacuum systems.

Although the invention has been described in detail with reference to certain preferred embodiments, variations and modifications exist within the scope and spirit of one or more independent aspects of the invention as described.

Various features of the invention are set forth in the following claims.

What is claimed is:

1. A dust collector for use with a hand-held power tool, the dust collector comprising:
    a housing;
    a motor positioned in the housing;
    a telescoping suction pipe coupled to the housing;
    a suction fan coupled to the motor and operable to generate a vacuum in the telescoping suction pipe;
    a dust container coupled to the housing and positioned upstream of the suction fan;
    a filter at least partially arranged in the dust container; and
    a filter cleaning mechanism including a solenoid configured to be actuated by a controller to dislodge dust from the filter when either the motor or the suction fan transitions from an active state to an inactive state.

2. The dust collector of claim 1, wherein the suction fan transitions from the active state to the inactive state when one of:
    the suction fan stops rotating; or
    a rotational speed of the suction fan slows to less than a predetermined threshold rotational speed.

3. The dust collector of claim 1, wherein the motor transitions from an active state to an inactive state when one of:
    the motor stops rotating; or
    a rotational speed of the motor slows to less than a predetermined threshold rotational speed.

4. The dust collector of claim 1, wherein the motor transitions from an active state to an inactive state when the motor stops providing torque to the suction fan.

5. The dust collector of claim 1, wherein in response to being actuated, the solenoid impacts the filter to dislodge dust from the filter.

6. The dust collector of claim 1, wherein the solenoid includes a pin movable between a first position and a second position in response to the solenoid being actuated.

7. The dust collector of claim 6, wherein the filter cleaning mechanism further comprises a bell crank, and wherein when the pin moves from the first position to the second position, the pin drives the bell crank to impact the filter, thereby dislodging dust therefrom.

8. The dust collector of claim 7, wherein the bell crank is configured to impact a rim of the filter along a direction parallel to a face of the filter.

9. A hand-held power tool comprising:
a housing;
a motor;
a suction pipe;
a suction fan operable to generate a vacuum in the suction pipe;
a dust container positioned upstream of the suction fan;
a filter at least partially arranged in the dust container; and
a filter cleaning mechanism including a solenoid configured to be actuated by a controller to dislodge dust from the filter when either the motor or the suction fan transitions from an active state to an inactive state.

10. The hand-held power tool of claim 9, wherein the motor is positioned in the housing.

11. The hand-held power tool of claim 10, wherein a battery from the power tool powers the motor.

12. The hand-held power tool of claim 10, wherein the suction fan is positioned in the housing.

13. The hand-held power tool of claim 12, wherein the housing is a dust extractor housing that couples to power tool housing.

14. The hand-held power tool of claim 9, wherein the controller monitors a current applied to the motor.

15. The hand-held power tool of claim 9, wherein the controller monitors a rotation of the suction fan.

16. A hand-held power tool comprising:
a first housing;
a second housing coupled to the first housing;
a telescoping suction pipe coupled to the second housing;
a suction pipe configured to receive a vacuum;
the second housing positioned upstream of the suction fan;
a filter at least partially arranged in the second housing; and
a filter cleaning mechanism including a solenoid configured to be actuated by a controller to dislodge dust from the filter when the suction fan transitions from an active state to an inactive state.

17. The hand-held power tool of claim 16, wherein a first battery coupled to the first housing powers a first motor.

18. The hand-held power tool of claim 17, wherein a second battery coupled to the second housing powers a second motor.

19. The hand-held power tool of claim 16, wherein the solenoid is in an energized state when the controller detects the fan in an inactive state.

20. The hand-held power tool of claim 16, wherein the controller informs a user when the pressure drops below or exceeds a predetermined threshold.

\* \* \* \* \*